United States Patent
Ito et al.

(10) Patent No.: US 9,909,928 B2
(45) Date of Patent: Mar. 6, 2018

(54) WIRELESS THERMOMETER ON A FILM-LIKE SUBSTRATE USING QUARTZ VIBRATOR

(71) Applicant: Murata Manufacturing Co., Ltd., Kyoto (JP)

(72) Inventors: Yoshihiro Ito, Kyoto (JP); Yuri Hoshino, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 529 days.

(21) Appl. No.: 14/493,465

(22) Filed: Sep. 23, 2014

(65) Prior Publication Data
US 2015/0010040 A1 Jan. 8, 2015

Related U.S. Application Data

(63) Continuation of application No. PCT/JP2013/057374, filed on Mar. 15, 2013.

(30) Foreign Application Priority Data

Mar. 23, 2012 (JP) .................................. 2012-066451

(51) Int. Cl.
*G01K 1/14* (2006.01)
*G08C 19/12* (2006.01)
(Continued)

(52) U.S. Cl.
CPC ............... *G01K 1/024* (2013.01); *G01K 7/32* (2013.01); *G01K 13/00* (2013.01); *G01K 13/002* (2013.01)

(58) Field of Classification Search
CPC combination set(s) only.
See application file for complete search history.

(56) References Cited

U.S. PATENT DOCUMENTS 7,086,593 B2 * 8/2006 Woodard ............ B60C 23/0449
235/435
8,636,407 B2 * 1/2014 Woodard ................. G01K 7/38
374/1
(Continued)

FOREIGN PATENT DOCUMENTS

JP 2005-207992 A 8/2005
JP 2007-315917 A 12/2007
(Continued)

OTHER PUBLICATIONS

International Search Report issued in Application No. PCT/JP2013/057374 dated Apr. 23, 2013.

*Primary Examiner* — Lisa Caputo
*Assistant Examiner* — Nasir U Ahmed
(74) *Attorney, Agent, or Firm* — Pearne & Gordon LLP

(57) ABSTRACT

A wireless thermometer is provided, which measures a deep temperature with high accuracy and has an improved communication distance. A wireless thermometer includes a flat film-like substrate. A quartz crystal vibrator and an antenna are disposed on a principal surface of the substrate. A quartz crystal vibrator and an antenna are disposed on the other principal surface of the substrate. A winding conductor of the antenna is substantially symmetrical with a winding conductor of the antenna with respect to the substrate. A lead conductor of the antenna is connected to the winding conductor at one end and is connected to the quartz crystal vibrator at the other end. A central portion of the lead conductor is bent. By folding the central portion, the quartz crystal vibrator can be positioned opposite the quartz crystal vibrator with a heat insulator interposed there between.

24 Claims, 14 Drawing Sheets

(51) Int. Cl.
*G01K 1/02* (2006.01)
*G01K 7/32* (2006.01)
*G01K 13/00* (2006.01)

(56) References Cited

U.S. PATENT DOCUMENTS

| | | | | |
|---|---|---|---|---|
| 2005/0226310 | A1* | 10/2005 | Nakazawa | G01K 13/002 374/208 |
| 2008/0210928 | A1* | 9/2008 | Abe | B82Y 10/00 257/40 |
| 2009/0267225 | A1* | 10/2009 | Eguchi | H01L 21/561 257/729 |

FOREIGN PATENT DOCUMENTS

| | | |
|---|---|---|
| JP | 2009-222543 A | 10/2009 |
| JP | 2012-007963 A | 1/2012 |

* cited by examiner

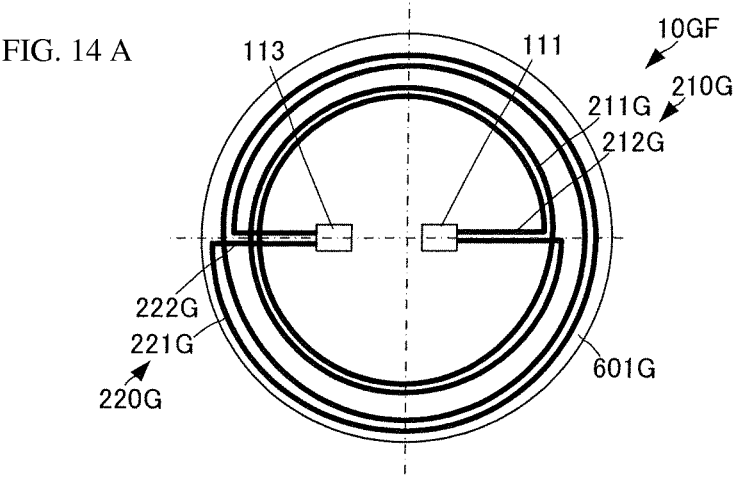
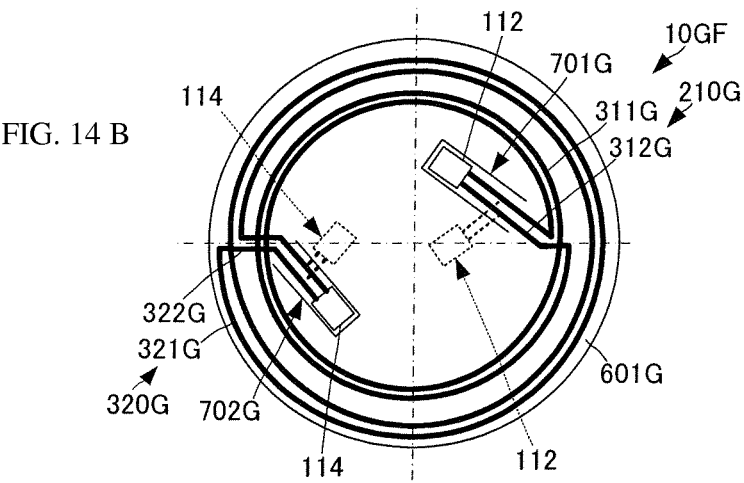

WIRELESS THERMOMETER ON A FILM-LIKE SUBSTRATE USING QUARTZ VIBRATOR

BACKGROUND OF THE INVENTION

Field of the Invention

The present invention relates to a wireless thermometer that measures a physical quantity determined by a temperature of an object whose temperature is to be measured, and wirelessly transmits the physical quantity to an external device.

Description of the Related Art

Conventionally, various deep temperature measuring devices have been devised, which measure not only a surface temperature of an object but also a deep temperature of the object. For example, a deep temperature measuring device is disclosed in Patent Document 1. The deep temperature measuring device disclosed in Patent Document 1 includes a first temperature sensor (surface-side temperature sensor) group mounted on a surface of an object whose temperature is to be measured (hereinafter simply referred to as an object) and a second temperature sensor temperature (outside-air-side temperature sensor) group disposed at a position spaced by a predetermined distance from the surface of the object.

A heat insulator having a predetermined thickness is disposed between the first temperature sensor group and the second temperature sensor group.

The deep temperature measuring device disclosed in Patent Document 1 measures a deep temperature of the object by determining a difference between a temperature measured by temperature sensors included in the first temperature sensor group and a temperature measured by temperature sensors included in the second temperature sensor group.

An antenna is connected to each temperature sensor, and the measured temperature is transmitted to the outside through wireless communication.

Patent Document 1: Japanese Unexamined Patent Application Publication No. 2007-315917

BRIEF SUMMARY OF THE INVENTION

The deep temperature measuring device disclosed in Patent Document 1 has a structure in which a plurality of temperature sensors included in the first temperature sensor group and the second temperature sensor group are physically connected to a single antenna by an electrode pattern. As a result, the plurality of temperature sensors are connected to one another by the electrode pattern.

Therefore, in heat conduction from the surface of the object to the outside, heat is conducted not only through the heat insulator between the first temperature sensor group and the second temperature sensor group, but also through the electrode pattern. This degrades the accuracy in the measurement of the deep temperature.

An attempt to reduce the size of the thermometer results in a reduced size of the antenna. For example, when the antenna has a winding shape, the number of the turns of the antenna is reduced. This reduces the distance the measurement results (e.g., the measured temperatures) can be communicated to the outside.

The present invention aims to provide a wireless thermometer capable of measuring a deep temperature with high accuracy and having an improved communication distance.

A wireless thermometer according to the present invention includes a heat insulator having a predetermined thickness, a predetermined thermal resistivity, and a first principal surface and a second principal surface opposite each other; first temperature detecting means disposed on the first principal surface of the heat insulator; second temperature detecting means disposed on the second principal surface of the heat insulator; a first antenna connected to the first temperature detecting means and configured to transmit a first detection signal generated by the first temperature detecting means; and a second antenna connected to the second temperature detecting means and configured to transmit a second detection signal generated by the second temperature detecting means. The first antenna and the second antenna are spaced apart by a predetermined distance in a direction parallel to a thickness direction of the heat insulator, and antenna forming regions at least partially overlapped with each other, as viewed in the direction parallel to the thickness direction.

In this configuration, the first temperature detecting means and the second temperature detecting means are individually provided with antennas and disposed with the heat insulator interposed therebetween. Thus, when the first temperature detecting means is on the object side, heat is conducted from the first temperature detecting means to the second temperature detecting means through the heat insulator, not through any electrode. Thus, since a temperature difference between the first temperature detecting means and the second temperature detecting means is not affected by heat conduction through an electrode, an accurate temperature difference corresponding to the deep temperature can be obtained. When the antenna forming regions of the first antenna and the second antenna are partially overlapped with each other as viewed in the direction parallel to the thickness direction, the first antenna and the second antenna are coupled to each other by magnetic field coupling. This increases the communication distance.

A wireless thermometer according to the present invention includes a heat insulator having a predetermined thickness, a predetermined thermal resistivity, and a first principal surface and a second principal surface opposite each other; first temperature detecting means disposed on the first principal surface of the heat insulator; second temperature detecting means disposed on the second principal surface of the heat insulator; a first antenna connected to the first temperature detecting means and configured to transmit a first detection signal generated by the first temperature detecting means; and a second antenna connected to the second temperature detecting means and configured to transmit a second detection signal generated by the second temperature detecting means. The first antenna and the second antenna are arranged close to each other in substantially the same plane parallel to the first principal surface and the second principal surface.

In this configuration, the first antenna and the second antenna are arranged close to each other in substantially the same plane. This allows the magnetic field coupling between the first antenna and the second antenna, and increases the communication distance.

The wireless thermometer of the present invention preferably has the following configuration. At least one of a first lead conductor connecting the first temperature detecting means to the first antenna and a second lead conductor connecting the second temperature detecting means to the second antenna has at least one bent portion. The bent portion is formed such that the first temperature detecting means and the second temperature detecting means are made to be overlapped with each other by folding, as viewed in a direction orthogonal to a plane.

In this configuration, the position of at least one of the first temperature detecting means and the second temperature detecting means in plan view (i.e., the position as viewed from the plane orthogonal to the thickness direction of the heat insulator) can be moved. Thus, the first temperature detecting means and the second temperature detecting means can be easily arranged at positions overlapping with each other along the thickness direction of the heat insulator.

In the wireless thermometer of the present invention, at least an overlapping portion of the first lead conductor or the second lead conductor, the overlapping portion being formed by folding, is preferably sandwiched between insulating layers.

In this configuration, even when the first lead conductor or the second lead conductor is folded, a short circuit between conductors can be prevented. Thus, the wireless thermometer can be reliably operated.

In the wireless thermometer of the present invention, the overlapping portion formed by folding may be in contact with a surface of the substrate, the surface being opposite a surface where the first lead conductor or the second lead conductor is formed.

In this configuration, since the substrate is interposed between the folded conductors, a short circuit between the conductors can be prevented.

In the wireless thermometer of the present invention, the overlapping portion formed by folding is preferably welded or bonded.

With this configuration, an end of the folded portion can be secured. This fixes the shape of the wireless thermometer, and improves the efficiency in assembling the wireless thermometer.

In the wireless thermometer of the present invention, the substrate is preferably provided with a cut or an indentation at a position of a folded portion of the first lead conductor or the second lead conductor.

With this configuration, the first lead conductor or the second lead conductor can be easily folded at an appropriate position.

In the wireless thermometer of the present invention, the folded portion may be made of a thermally deformable material.

In this configuration, the folding can be easily done with heat.

In the wireless thermometer of the present invention, the first antenna and the second antenna may be wound on a surface substantially orthogonal to the thickness direction of the heat insulator.

This configuration provides a concrete example of the shape of the first antenna and the second antenna. In this case, a magnetic field coupling antenna can be provided.

In the wireless thermometer of the present invention, it is preferable that the first temperature detecting means and the second temperature detecting means operate in response to respective radio signals input through the first antenna and the second antenna, and generate the first detection signal and the second detection signal, respectively, corresponding to detected temperatures.

In this configuration, there is no need to provide a power supply for operating the first temperature detecting means and the second temperature detecting means. This makes it possible to reduce the size of the wireless thermometer.

In the wireless thermometer of the present invention, the first antenna and the second antenna may be formed on different substrates.

This configuration provides a concrete example of formation of the first antenna and the second antenna on substrates. With this configuration, since the first antenna and the second antenna are formed on different substrates, even if, for example, one of the antennas has a problem, it is only necessary that one of the antennas be corrected or replaced.

In the wireless thermometer of the present invention, the first antenna and the second antenna may be formed on a single substrate.

In this configuration, where the first antenna and the second antenna are formed on a single substrate, it is possible to simplify the components of the wireless thermometer.

In the wireless thermometer of the present invention, the first antenna and the second antenna may be formed on opposite surfaces of the single substrate.

In this configuration, although the first antenna and the second antenna are formed on the single substrate, their antenna forming regions do not interfere with each other. This increases the degree of the freedom of the design of the first antenna, the second antenna, and the lead conductors connected thereto.

In the wireless thermometer of the present invention, the first antenna and the second antenna may be formed on a surface of the single substrate.

This configuration facilitates the manufacture because the first antenna and the second antenna are formed on one side of the single substrate.

In the wireless thermometer of the present invention, one of the first antenna and the second antenna may be disposed to surround the other.

This configuration provides a concrete example of the positional relationship between the first antenna and the second antenna.

In the wireless thermometer of the present invention, a shape of a radiating portion of the first antenna is preferably substantially the same as a shape of a radiating portion of the second antenna.

With this configuration, the degree of the coupling between the first antenna and an external antenna can be made substantially the same as the degree of the coupling between the second antenna and the external antenna.

In the wireless thermometer of the present invention, it is preferable that the number of at least one of the first temperature detecting means and the second temperature detecting means be more than one, and that an antenna be provided for each of the temperature detecting means.

With this configuration, a deep temperature can be measured at a plurality of points. By using the measured deep temperatures, a deep temperature can be calculated with higher accuracy.

In the wireless thermometer of the present invention, the antennas connected to the more than one temperature detecting means are preferably arranged close to each other as viewed along the thickness direction of the heat insulator.

With this configuration, where the antennas close to each other in the same plane are coupled to each other by magnetic field coupling, it is possible to widen the range of transmission.

In the wireless thermometer of the present invention, the first temperature detecting means and the second temperature detecting means are each preferably a resonator having a resonance frequency that varies with temperature. In the wireless thermometer of the present invention, the resonator may be a quartz crystal vibrator. In the wireless thermometer of the present invention, the first temperature detecting means and the second temperature detecting means may each be an RFID-IC having a temperature sensor.

These configurations provide the concrete examples of the first temperature detecting means and the second temperature detecting means.

The wireless thermometer of the present invention may be a deep body thermometer that includes mounting means for mounting on a temperature measured portion of an object, the deep body thermometer being configured to measure a deep body temperature of the object.

This configuration provides a concrete example of the application of the wireless thermometer.

The present invention can provide a wireless thermometer capable of measuring a deep body temperature with high accuracy and having a long communication distance.

BRIEF DESCRIPTION OF THE SEVERAL VIEWS OF THE DRAWINGS

FIG. 14(A) to FIG. 14(B) illustrate configurations of a base member 10GF of a wireless thermometer according to a tenth embodiment of the present invention.

DETAILED DESCRIPTION OF THE INVENTION

Figure 1:
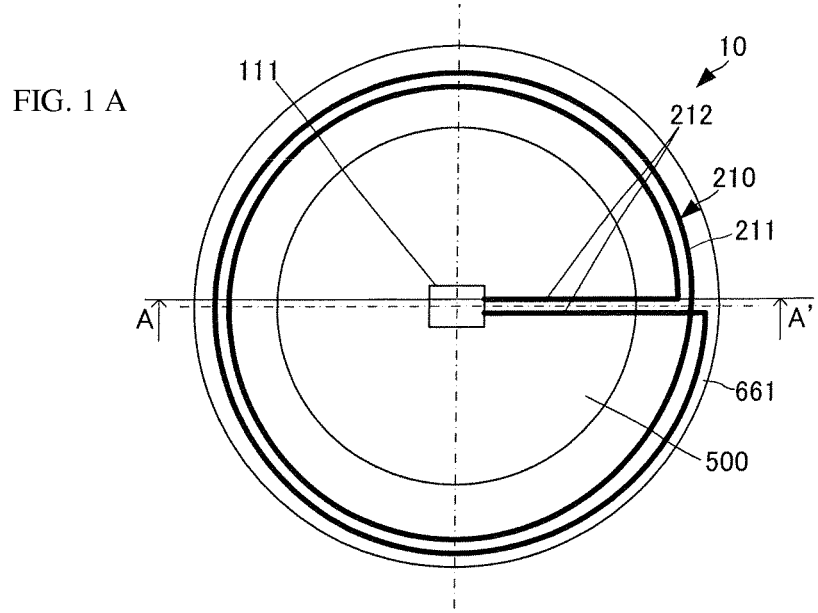
FIG. 1(A) to FIG. 1(C) illustrate configurations of a wireless thermometer 10 according to the present embodiment.
Figure 1:
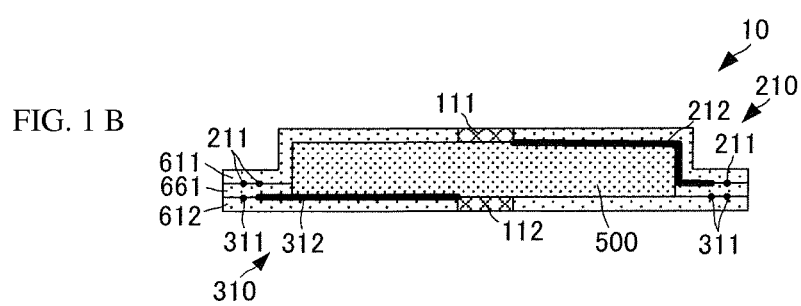
Figure 1:
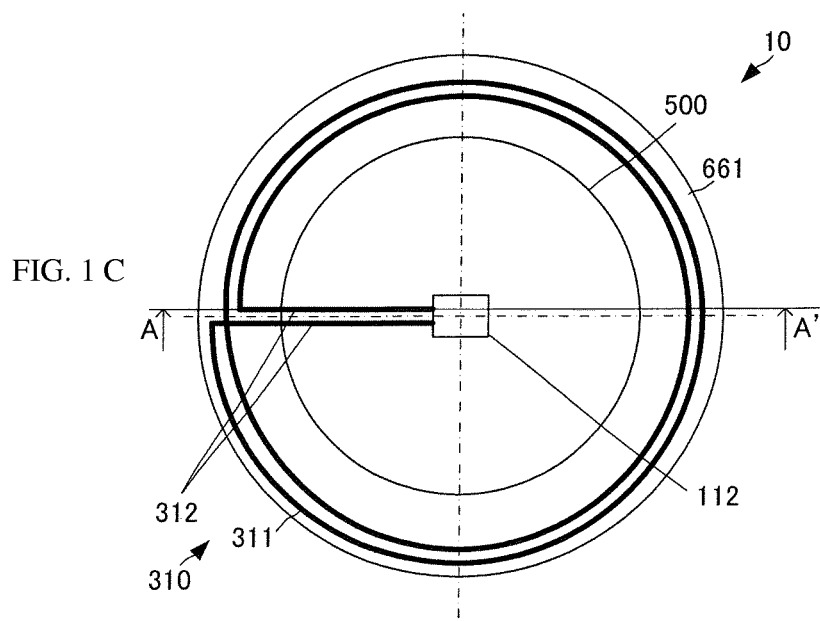

A wireless thermometer according to a first embodiment of the present invention will be described with reference to the drawings. The present embodiment deals with the case where a wireless thermometer 10 and a portable base terminal 90 communicate with each other through magnetic field coupling. The communication method is not limited to magnetic field coupling, and may be another wireless communication method. For example, the communication may be made through electric field coupling or radio waves. FIG. 1 illustrates a configuration of the wireless thermometer 10 according to the present embodiment. FIG. 1(A) is its top view with a top heat insulator 611 omitted, FIG. 1(B) is a cross-sectional view taken along line A-A' of FIGS. 1(A) and 1(C), and FIG. 1(C) is its bottom view with a bottom heat insulator 612 omitted.

The wireless thermometer 10 includes a heat insulator 500 having flexibility, insulating properties, and a predetermined thermal resistivity $\rho_T$. The heat insulator 500 is circular in plan view (as viewed from the top or bottom), and has a predetermined thickness D. The heat insulator 500 is made of a material having the thermal resistivity $\rho_T$ substantially the same as the thermal resistivity of an object.

The bottom heat insulator 612 is disposed on a lower side of the heat insulator 500. The bottom heat insulator 612 has flexibility and insulating properties and is thinner than the heat insulator 500. In plan view, the bottom heat insulator 612 is circular in shape and larger in area than the heat insulator 500. The bottom heat insulator 612 is attached to the heat insulator 500 such that the center of the bottom heat insulator 612 are substantially overlapped with the center of the heat insulator 500 in plan view. Thus, in plan view, the bottom heat insulator 612 extends beyond the outer edge of the heat insulator 500 in a predetermined range.

A quartz crystal vibrator 112 is disposed in a surface of the bottom heat insulator 612, the surface being in contact with the heat insulator 500. The quartz crystal vibrator 112 is an element that resonates at a predetermined resonance frequency fp2 in accordance with a sensed temperature. The quartz crystal vibrator 112 corresponds to "the second temperature detecting means" of the present invention. The quartz crystal vibrator 112 is located at substantially the center of the bottom heat insulator 612 in plan view.

An antenna 310 is disposed on the surface of the bottom heat insulator 612 where the quartz crystal vibrator 112 is disposed. The antenna 310 corresponds to "the second antenna" of the present invention. The antenna 310 includes a winding conductor 311 and a lead conductor 312. The winding conductor 311 is a conductor wound along the outer edge of the bottom heat insulator 612, and is formed near the outer edge of the bottom heat insulator 612. The diameter and the number of the turns of the winding conductor 311 are appropriately set in accordance with the resonance frequency band of the quartz crystal vibrator 112, the necessary inductance, and the range of the formation of the conductor that can be used. For example, the winding conductor 311 is wound twice in FIG. 1.

Both end portions of the winding conductor 311 are connected to the quartz crystal vibrator 112 by the lead conductor 312 routed to connect the outer edge and the center of the bottom heat insulator 612. In the vicinity of a point where the winding conductor 311 and the lead conductor 312 are connected, there is an area where the conductors overlap each other along the thickness direction. For example, in this area, a thin insulating film may be placed between the conductors.

The bottom heat insulator 612 may be configured such that a surface of the quartz crystal vibrator 112 (i.e., the surface being opposite the surface in contact with the heat insulator 500) is exposed to the outside. For example, the exposed surface of the bottom heat insulator 612 may be sticky.

The top heat insulator 611 is disposed on an upper side of the heat insulator 500. The top heat insulator 611 has flexibility and insulating properties and is thinner than the heat insulator 500. In plan view, the top heat insulator 611 is circular in shape and larger in area than the heat insulator 500. The top heat insulator 611 is attached to the heat insulator 500 such that the center of the top heat insulator 611 is substantially overlapped with the center of the heat insulator 500 in plan view. The top heat insulator 611 is formed to cover the side face of the heat insulator 500 and the entire surface of the bottom heat insulator 612 adjacent to the heat insulator 500. Thus, in a region where the top heat insulator 611 extends beyond the outer edge of the heat insulator 500 in the predetermined range, the top heat insulator 611 and the bottom heat insulator 612 face each other without the heat insulator 500 therebetween. In this region, an insulating layer 661 is disposed between the top heat insulator 611 and the bottom heat insulator 612.

The quartz crystal vibrator 111 is disposed in a surface of the top heat insulator 611, the surface being in contact with the heat insulator 500. The quartz crystal vibrator 111 is an element that resonates at a predetermined resonance frequency fp1 in accordance with a sensed temperature. The quartz crystal vibrator 111 corresponds to "the first temperature detecting means" of the present invention. The quartz crystal vibrator 111 is located at substantially the center of the top heat insulator 611 in plan view. Thus, the quartz crystal vibrator 111 and the quartz crystal vibrator 112 are overlapped with each other in plan view of the heat insulator 500 (wireless thermometer 10), or in other words, they are stacked along the thickness direction of the heat insulator 500.

An antenna 210 is disposed on the surface of the top heat insulator 611 where the quartz crystal vibrator 111 is disposed. The antenna 210 corresponds to "the first antenna" of the present invention. The antenna 210 includes a winding conductor 211 and a lead conductor 212. The winding conductor 211 is a conductor wound along the outer edge of the top heat insulator 611, and is formed near the outer edge of the top heat insulator 611. The diameter and the number of the turns of the winding conductor 211 are appropriately set in accordance with the resonance frequency band of the quartz crystal vibrator 111, the necessary inductance, and the range of formation of the conductor that can be used. For example, the winding conductor 211 is wound twice in FIG. 1. The winding conductor 211 is disposed to be substantially symmetrical with the winding conductor 311 with respect to the insulating layer 661.

In this configuration, the resonance frequency of the quartz crystal vibrator 111 is made substantially the same as that of the quartz crystal vibrator 112. This can make the shape of the winding conductor 211 of the antenna 210 substantially the same as that of the winding conductor 311 of the antenna 310.

Since the shape of the winding conductor 211 is substantially the same as that of the winding conductor 311, the winding conductor 211 and the winding conductor 311 can be disposed to be substantially overlapped with each other in plan view of the wireless thermometer 10, as illustrated in FIG. 1. Additionally, the degree of the coupling between the antenna 210 and an external antenna (e.g., base-side antenna 94 described below) can be made substantially the same as that between the antenna 310 and the external antenna (e.g., base-side antenna 94). Moreover, the resonance frequency of a closed circuit formed by the antenna 210 and the quartz crystal vibrator 111 can be made substantially the same as that of a closed circuit formed by the antenna 310 and the quartz crystal vibrator 112. This facilitates the coupling between these antennas.

Both end portions of the winding conductor 211 are connected to the quartz crystal vibrator 111 by the lead conductor 212 routed to connect the outer edge and the center of the top heat insulator 611. In the vicinity of a point where the winding conductor 211 and the lead conductor 212 are connected, there is an area where the conductors overlap each other along the thickness direction. For example, in this area, a thin insulating film may be placed between the conductors.

In the configuration of the present embodiment, the quartz crystal vibrator 111 and the quartz crystal vibrator 112 are not connected to each other by any conductor. Thus, when a deep temperature is measured, with the quartz crystal vibrator 112 located on the object side and the quartz crystal vibrator 111 located on the outside air side, heat from the object is transferred only by the heat insulator 500 between the quartz crystal vibrator 111 and the quartz crystal vibrator 112. Therefore, a temperature difference between the sensed temperature of the quartz crystal vibrator 111 and the sensed temperature of the quartz crystal vibrator 112 is not affected by any conductor, and is dependent only on the heat insulator 500. Thus, when a deep temperature is measures by using the physical properties of the heat insulator 500, the deep temperature can be measured with high accuracy.

In the configuration of the present embodiment, the antennas 210 and 310 overlap each other in plan view, with the thin insulating layer 661 interposed therebetween. This allows the magnetic field coupling between the winding conductor 211 of the antenna 210 and the winding conductor 311 of the antenna 310 and increases the transmission and reception distance.

Although the antennas 210 and 310 are overlapped with each other in plan view in the present embodiment, the structure is not limited to this. The effects of the present invention can be sufficiently achieved when at least parts of the first antenna and the second antenna are overlapped with each other in plan view.

Figure 2:
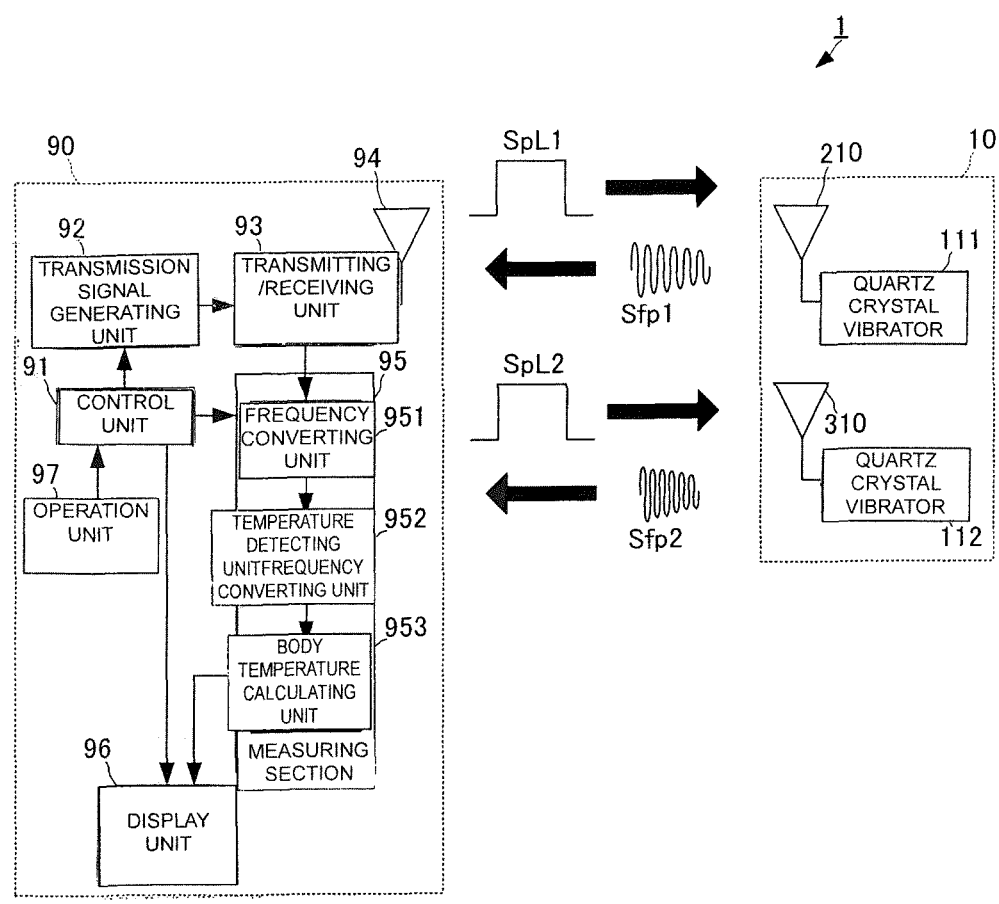
FIG. 2 is a block diagram illustrating a main circuit configuration of a wireless temperature measuring system 1 according to the present embodiment.

Specifically, the wireless thermometer 10 described above forms a wireless deep temperature measuring system together with the portable base terminal 90 having the following configuration. FIG. 2 is a block diagram illustrating a main circuit configuration of a wireless temperature measuring system 1 according to the present embodiment.

First, the underside of the wireless thermometer 10 having the quartz crystal vibrator 112 and the antenna 310 is mounted on the surface of the object. The portable base terminal 90 transmits a first pulse signal SpL1 and a second pulse signal SpL2 to the wireless thermometer 10 mounted on the object as described above. To transmit the first pulse signal SpL1 and the second pulse signal SpL2, the portable base terminal 90 is brought to a position which is close enough to communicate with the antennas 210 and 310 of the wireless thermometer 10 through magnetic field coupling.

The first pulse signal SpL1, which is a radio signal for driving the quartz crystal vibrator 111, is received by the antenna 210 and applied to the quartz crystal vibrator 111. The quartz crystal vibrator 111 resonates in response to the first pulse signal SpL1 and outputs a first resonance signal Sfp1. The first resonance signal Sfp1 corresponds to a detection signal of the present invention. The first resonance signal Sfp1 is transmitted to the antenna 210. The first resonance signal Sfp1 transmitted to the antenna 210 is further transmitted through magnetic field coupling to the portable base terminal 90.

The frequency fp1 of the first resonance signal Sfp1 changes depending on the temperature sensed by the quartz crystal vibrator 111. A temperature is uniquely determined for one resonance frequency. Specifically, the resonance frequency fp1 is uniquely determined depending on the temperature at which heat of the object is conducted through the heat insulator 500 having the thermal resistivity $\rho_T$ and the thickness D to the outside air side, so that the first resonance signal Sfp1 having the resonance frequency fp1 is output.

The second pulse signal SpL2, which is a radio signal for driving the quartz crystal vibrator 112, is received by the antenna 310 and applied to the quartz crystal vibrator 112. The quartz crystal vibrator 112 resonates in response to the second pulse signal SpL2 and outputs a second resonance signal Sfp2. The second resonance signal Sfp2 corresponds to a second detection signal of the present invention. The second resonance signal Sfp2 is transmitted to the antenna 310. The second resonance signal Sfp2 transmitted to the antenna 310 is further transmitted through magnetic field coupling to the portable base terminal 90.

The frequency fp2 of the second resonance signal Sfp2 changes depending on the temperature sensed by the quartz crystal vibrator 112. A temperature is uniquely determined for one resonance frequency. Specifically, the resonance frequency fp2 is uniquely determined depending on the temperature of the object, so that the second resonance signal Sfp2 having the resonance frequency fp2 is output.

The portable base terminal 90 includes a control unit 91, a transmission signal generating unit 92, a transmitting/receiving unit 93, the base-side antenna 94, a measuring section 95, a display unit 96, and an operation unit 97. The control unit 91 controls an overall operation of the portable base terminal 90. The control unit 91 executes various types of control processing in response to an operation input from the operation unit 97. For example, upon receipt of an operation input for measurement of body temperature, the control unit 91 first controls the transmission signal generating unit 92 to generate the first pulse signal SpL1.

In response to the control for generating the first pulse signal SpL1, the transmission signal generating unit 92 generates the first pulse signal SpL1 formed by a carrier wave having a first frequency, and gives the first pulse signal SpL1 to the transmitting/receiving unit 93. Specifically, to make frequency components of the first pulse signal SpL1 substantially match the frequency band that the quartz crystal vibrator 111 can have in the range of temperatures detected by the wireless thermometer 10, the carrier frequency is set to a value close to the resonance frequency of the quartz crystal vibrator 111 and a pulse width (burst time) that determines the band width is set to an appropriate value.

The transmitting/receiving unit 93 outputs the first pulse signal SpL1 to the base-side antenna 94. The base-side antenna 94 has the same structure as that of the antenna 210 of the wireless thermometer 10 and radiates the first pulse signal SpL1.

The base-side antenna 94 receives the first resonance signal Sfp1 radiated from the antenna 210 of the wireless thermometer 10 and outputs the received first resonance signal Sfp1 to the transmitting/receiving unit 93. The transmitting/receiving unit 93 outputs the received first resonance signal Sfp1 to the measuring section 95.

After confirming reception of the first resonance signal Sfp1, or after elapse of a certain period of time from controlling the transmission signal generating unit 92 to generate the first pulse signal SpL1, the control unit 91 controls the transmission signal generating unit 92 to generate the second pulse signal SpL2.

In response to the control for generating the second pulse signal SpL2, the transmission signal generating unit 92 generates the second pulse signal SpL2 formed by a carrier wave having a second frequency different from the first frequency, and gives the second pulse signal SpL2 to the transmitting/receiving unit 93. Specifically, to make frequency components of the second pulse signal SpL2 substantially match the frequency band that the quartz crystal vibrator 112 can have in the range of temperatures detected by the wireless thermometer 10, the carrier frequency of the second pulse signal SpL2 is set to a value close to the resonance frequency of the quartz crystal vibrator 112 and a pulse width (burst time) that determines the band width is set to an appropriate value.

The base-side antenna 94 receives the second resonance signal Sfp2 radiated from the antenna 310 of the wireless thermometer 10 and outputs the received second resonance signal Sfp2 to the transmitting/receiving unit 93. The transmitting/receiving unit 93 outputs the received second resonance signal Sfp2 to the measuring section 95.

The measuring section 95 includes a frequency converting unit 951, a temperature detecting unit 952, and a temperature calculating unit 953. By means of FFT processing or the like, the frequency converting unit 951 obtains a frequency spectrum from each of the first resonance signal Sfp1 and the second resonance signal Sfp2 on the time axis. The present embodiment shows an example where the first resonance signal Sfp1 and the second resonance signal Sfp2 are read separately. However, the first resonance signal Sfp1 and the second resonance signal Sfp2 can be simultaneously measured through a single transmission and reception when the frequency band that the quartz crystal vibrator 111 can have and the frequency band that the quartz crystal vibrator 112 can have in the range of temperatures detected by the wireless thermometer 10 are made as close as possible to each other and pulse signals having a wide range of frequency components including two frequency bands are transmitted.

In the temperature detecting unit 952, a relationship between the temperature and the frequency of the first resonance signal Sfp1 and a relationship between the temperature and the frequency of the second resonance signal Sfp2 are stored in advance.

The temperature detecting unit 952 detects a frequency spectrum peak of the first resonance signal Sfp1, and outputs a temperature associated with the peak frequency fp1 as an outside-air-side temperature Ts.

The temperature detecting unit 952 detects a frequency spectrum peak of the second resonance signal Sfp2, and outputs a temperature associated with the peak frequency fp2 as a surface temperature Tb.

On the basis of the outside-air-side temperature Ts, the surface temperature Tb, a thermal resistance $R_T$ of the heat insulator 500 between the quartz crystal vibrator 111 and the quartz crystal vibrator 112, and a thermal resistance $R_u$ of the object stored in advance, the temperature calculating unit 953 calculates a deep temperature Td of the object using the following equation:

$$Td=Ts+(R_T+R_u)\cdot(Tb-Ts)/R_T$$

The calculated deep temperature Td is output to the display unit 96 and a storage unit (not shown). The display unit 96 displays the result of deep body temperature measurement.

With the configuration described above, the deep temperature of the object can be measured simply by remotely providing a temperature detection trigger using the portable base terminal 90. By using the wireless thermometer 10 having the configuration described above, the deep temperature of the object can be measured more accurately than with a conventional configuration. Moreover, the deep temperature of the object can be measured even if the wireless thermometer 10 and the portable base terminal 90 are more distant from each other than in the conventional configuration.

Figure 3:
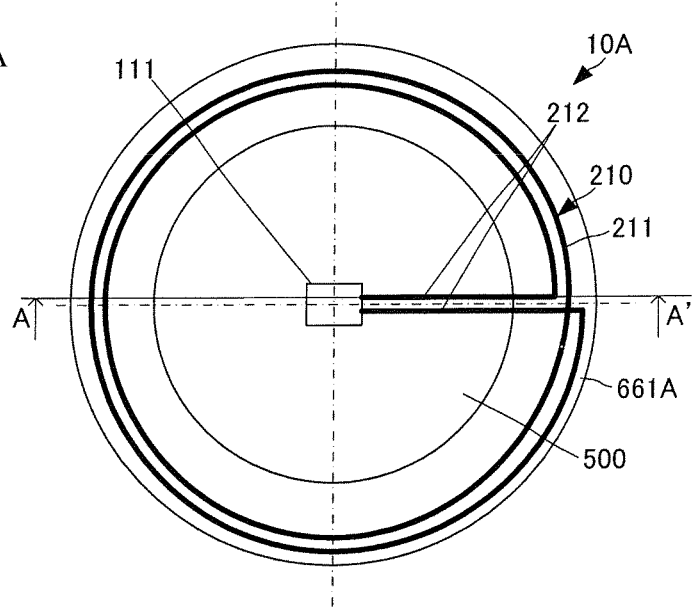
FIG. 3(A) to FIG. 3(C) illustrate configurations of a wireless thermometer 10A according to a second embodiment of the present invention.
Figure 3:
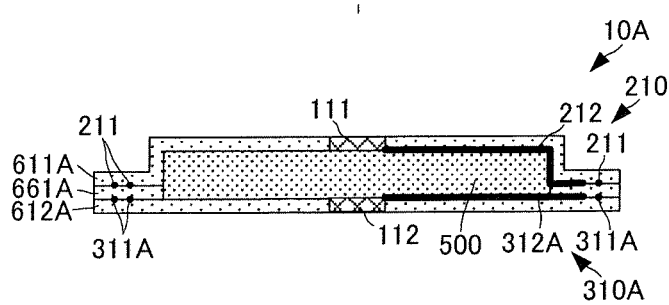
Figure 3:
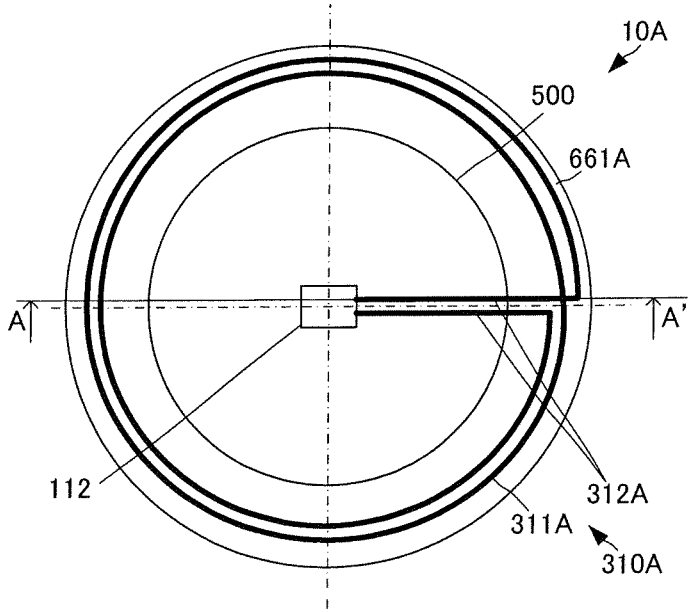

A wireless thermometer according to a second embodiment of the present invention will now be described with reference to the drawings. FIG. 3 illustrates a configuration of a wireless thermometer 10A according to the second embodiment of the present invention. FIG. 3(A) is a top view with a top heat insulator 611A omitted, FIG. 3(B) is a cross-sectional view taken along line A-A' of FIGS. 3(A) and 3(C), and FIG. 3(C) is a bottom view with a bottom heat insulator 612A omitted.

The wireless thermometer 10A of the present embodiment differs from the wireless thermometer 10 of the first embodiment in the shape of an antenna 310A, but the other configuration of the wireless thermometer 10A is the same as that of the wireless thermometer 10.

In plan view of the wireless thermometer 10A, a winding conductor 311A of the antenna 310A is overlapped with the winding conductor 211 of the antenna 210 over substantially the entire length thereof. Also in plan view of the wireless thermometer 10A, a lead conductor 312A of the antenna 310A and the lead conductor 212 of the antenna 210 are formed to extend in the same direction from the quartz crystal vibrators 111 and 112.

This configuration enhances the magnetic field coupling between the winding conductor 211 of the antenna 210 and the winding conductor 311A of the antenna 310. It is thus possible to increase the transmission and reception distance, that is, the measurement distance.

Figure 4:
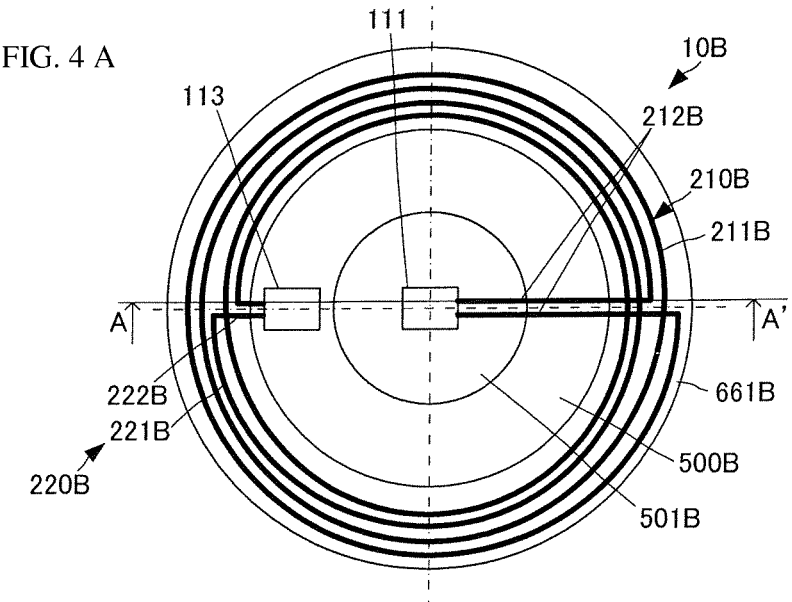
FIG. 4(A) to FIG. 4(C) illustrate configurations of a wireless thermometer 10B according to a third embodiment of the present invention.
Figure 4:
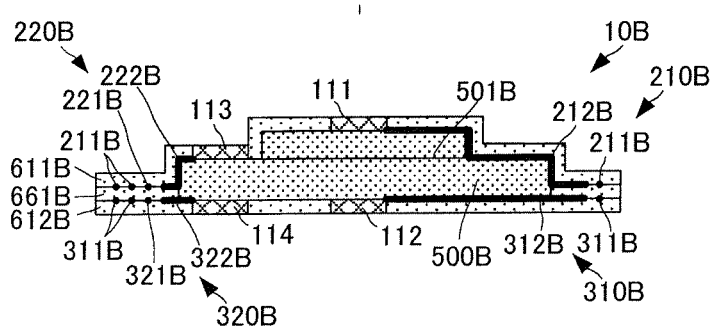
Figure 4:
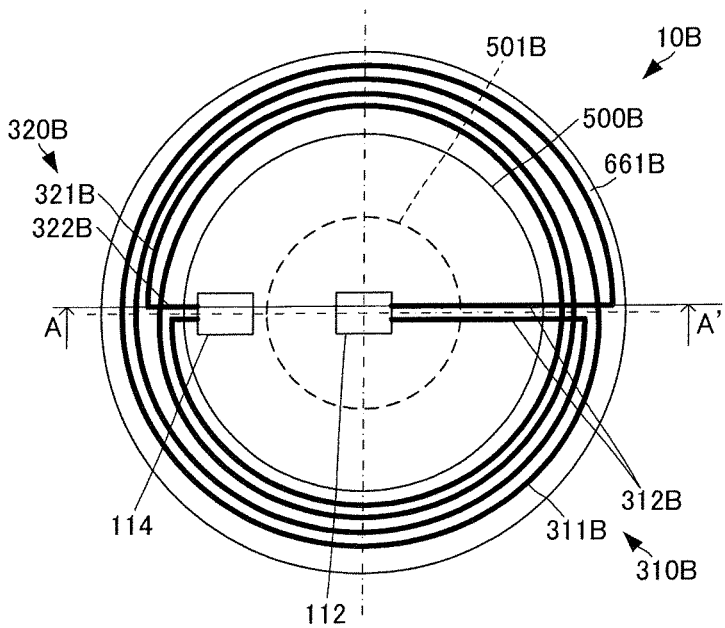

A wireless thermometer according to a third embodiment will now be described with reference to the drawings. FIG. 4 illustrates a configuration of a wireless thermometer 10B according to the third embodiment of the present invention. FIG. 4(A) is a top view with a top heat insulator 611B omitted, FIG. 4(B) is a cross-sectional view taken along line A-A' of FIGS. 4(A) and 4(C), and FIG. 4(C) is a bottom view with a bottom heat insulator 612B omitted.

The wireless thermometer 10B of the present embodiment includes two quartz crystal vibrators corresponding to the first temperature detecting means of the present invention, and two quartz crystal vibrators corresponding to the second temperature detecting means of the present invention. The number of quartz crystal vibrators is not limited to this, and there may be three or more quartz crystal vibrators each, or the number of quartz crystal vibrators serving as the first temperature detecting means may differ from the number of quartz crystal vibrators serving as the second temperature detecting means.

The wireless thermometer 10B includes a heat insulator 500B having flexibility, insulating properties, and a predetermined thermal resistivity $\rho_T$. The heat insulator 500B is circular in plan view (as viewed from the top or bottom), and has a predetermined thickness. The heat insulator 500B is made of a material having the thermal resistivity $\rho_T$ substantially the same as the thermal resistivity of the object.

The bottom heat insulator 612B is disposed on a lower side of the heat insulator 500B. The bottom heat insulator 612B has flexibility and insulating properties and is thinner than the heat insulator 500. In plan view, the bottom heat insulator 612B is circular in shape and larger in area than the heat insulator 500. The bottom heat insulator 612B is attached to the heat insulator 500 such that the center of the bottom heat insulator 612B is substantially overlapped with the center of the heat insulator 500B in plan view. Thus, in plan view, the bottom heat insulator 612B extends beyond the outer edge of the heat insulator 500B in a predetermined range.

The quartz crystal vibrators 112 and 114 are disposed in a surface of the bottom heat insulator 612B, the surface being in contact with the heat insulator 500B. The quartz crystal vibrator 112 is an element that resonates at the predetermined resonance frequency fp2 in accordance with a sensed temperature, and the quartz crystal vibrator 114 is an element that resonates at a predetermined resonance frequency fp4 in accordance with a sensed temperature. The quartz crystal vibrators 112 and 114 correspond to "second temperature detecting means" of the present invention.

The quartz crystal vibrator 112 is located at substantially the center of the bottom heat insulator 612*b* in plan view. The quartz crystal vibrator 114 is spaced by a predetermined distance from the quartz crystal vibrator 114 in the bottom heat insulator 612B. The quartz crystal vibrator 114 is disposed in a range overlapping the heat insulator 500B in plan view of the wireless thermometer 10B. The distance between the quartz crystal vibrator 112 and the quartz crystal vibrator 114 may be appropriately set in accordance with the specification.

An antenna 310B is disposed on the surface of the bottom heat insulator 612B where the quartz crystal vibrators 112 and 114 are disposed. The antenna 310B corresponds to "the second antenna" of the present invention. The antenna 310B includes a winding conductor 311B and a lead conductor 312B. The winding conductor 311B is a conductor wound along the outer edge of the bottom heat insulator 612B, and is formed near the outer edge of the bottom heat insulator 612B. The diameter and the number of the turns of the winding conductor 311B are appropriately set in accordance with the resonance frequency band of the quartz crystal vibrator 112, the necessary inductance, and the range of formation of the conductor that can be used.

Both end portions of the winding conductor 311B are connected to the quartz crystal vibrator 112 by the lead conductor 312B routed to connect the outer edge and the center of the bottom heat insulator 612B.

An antenna 320B is disposed on the surface of the bottom heat insulator 612B where the quartz crystal vibrators 112 and 114 are disposed. The antenna 320B corresponds to "the second antenna" of the present invention. The antenna 320B includes a winding conductor 321B and a lead conductor 322B. The winding conductor 321B is a conductor wound along the outer edge of the bottom heat insulator 612B, and is formed near the outer edge of the bottom heat insulator 612B. The winding conductor 321B is spaced inwardly from the winding conductor 311B by a proper distance. The diameter and the number of the turns of the winding conductor 321B are appropriately set in accordance with the resonance frequency band of the quartz crystal vibrator 114, the necessary inductance, and the range of formation of the conductor that can be used.

Both end portions of the winding conductor 321B are connected to the quartz crystal vibrator 114 by the lead conductor 322B routed to extend from the outer edge toward the center of the bottom heat insulator 612B.

In this configuration, there is an area where the antenna 310B and the antenna 320B overlap each other in plan view of the wireless thermometer 10B. For example, in this area, an insulating film thinner than the bottom heat insulator 612B may be placed between the conductors.

A heat insulator 501B is disposed on an upper side of the heat insulator 500B. The heat insulator 501B is disk-shaped as is the heat insulator 500B. The heat insulator 500B is made of the same material as the heat insulator 500B and has a predetermined thickness. The diameter of the heat insulator 501B is smaller than that of the heat insulator 500B. The heat insulator 501B is disposed such that the center of the heat insulator 501B is substantially overlapped with the center of the heat insulator 500B in plan view.

The top heat insulator 611B is disposed on an upper side of the heat insulator 501B. The top heat insulator 611B has flexibility and insulating properties and is much thinner than the heat insulators 500B and 501B. In plan view, the top heat insulator 611B is circular in shape and larger in area than the heat insulator 500B. A substrate 661B is attached to the heat insulator 501B such that the center of the top heat insulator 611B is substantially overlapped with the center of the heat insulators 500B and 501B in plan view. The top heat insulator 611B is formed to entirely cover the side face of the heat insulator 501B, the surface of the heat insulator 500B adjacent to the heat insulator 501B, the side face of the heat insulator 500B, and the surface of the bottom heat insulator 612B adjacent to the heat insulator 500. Thus, in a region where the top heat insulator 611B extends beyond the outer edge of the heat insulator 500B in a predetermined range, the top heat insulator 611B and the bottom heat insulator 612B face each other without any heat insulator therebetween. In this region, an insulating layer 661B is disposed between the top heat insulator 611B and the bottom heat insulator 612B.

The quartz crystal vibrator 111 is disposed in a surface of the top heat insulator 611B, the surface being in contact with the heat insulator 501B. The quartz crystal vibrator 111 is an element that resonates at the predetermined resonance frequency fp1 in accordance with a sensed temperature. The quartz crystal vibrator 111 corresponds to "the first temperature detecting means" of the present invention. The quartz crystal vibrator 111 is located at substantially the center of the top heat insulator 611B in plan view. Thus, the quartz crystal vibrator 111 and the quartz crystal vibrator 112 are overlapped with each other in plan view of the heat insulators 500B and 501B (wireless thermometer 10), or in other words, they are stacked along the thickness direction of the heat insulators 500B and 501B.

A quartz crystal vibrator 113 is disposed in a surface of the top heat insulator 611B, the surface being in contact with the heat insulator 500B. The quartz crystal vibrator 113 is an element that resonates at a predetermined resonance frequency fp3 in accordance with a sensed temperature. The quartz crystal vibrator 113 corresponds to "the first temperature detecting means" of the present invention. The quartz crystal vibrator 113 is spaced by a predetermined distance from the quartz crystal vibrator 111 in plan view of the top heat insulator 611B. The quartz crystal vibrator 113 is disposed in a range where the top heat insulator 611B is in contact with the heat insulator 500B. The quartz crystal vibrators 113 and 114 are overlapped with each other in plan view of the heat insulator 500B (wireless thermometer 10), or in other words, they are stacked along the thickness direction of the heat insulator 500B.

An antenna 210B is disposed on the surface of the top heat insulator 611B where the quartz crystal vibrator 111 is disposed. The antenna 210B corresponds to "the first antenna" of the present invention. The antenna 210B includes a winding conductor 211B and a lead conductor 212B. The winding conductor 211B is a conductor wound along the outer edge of the top heat insulator 611B, and is formed near the outer edge of the top heat insulator 611B. More specifically, the winding conductor 211B is formed in a region of the top heat insulator 611B, the region being in contact with the bottom heat insulator 612B with the insulating layer 661B interposed therebetween. The diameter and the number of the turns of the winding conductor 211B are appropriately set in accordance with the resonance frequency band of the quartz crystal vibrator 111, the necessary inductance, and the range of formation of the conductor that can be used. For example, the winding conductor 211B is wound twice in FIG. 1. The winding conductor 311B is disposed to be substantially symmetrical with the winding conductor 211B with respect to the insulating layer 661B.

In this configuration, the resonance frequency of the quartz crystal vibrator 111 is made substantially the same as that of the quartz crystal vibrator 112. This can make the shape of the winding conductor 211B of the antenna 210B substantially the same as that of the winding conductor 311B of the antenna 310B.

When the shape of the winding conductor 211B is substantially the same as that of the winding conductor 311B, the winding conductor 211B and the winding conductor 311B can be disposed to be substantially overlapped with each other in plan view of the wireless thermometer 10B, as illustrated in FIG. 4.

Both end portions of the winding conductor 211B are connected to the quartz crystal vibrator 111B by the lead conductor 212B routed to connect the outer edge and the center of the top heat insulator 611B.

An antenna 220B is disposed on the surface of the top heat insulator 611B where the quartz crystal vibrators 111 and 113 are disposed. The antenna 220B corresponds to "the first antenna" of the present invention. The antenna 220B includes a winding conductor 221B and a lead conductor 222B. The winding conductor 221B is a conductor wound along the outer edge of the top heat insulator 611B, and is formed near the outer edge of the top heat insulator 611B. More specifically, the winding conductor 221B is formed in a region of the top heat insulator 611B, the region being in contact with the insulating layer 661B. The winding conductor 221B is spaced inwardly from the winding conductor 211B by a proper distance. The diameter and the number of the turns of the winding conductor 221B are appropriately set in accordance with the resonance frequency band of the quartz crystal vibrator 114, the necessary inductance, and the range of formation of the conductor that can be used. The winding conductor 221B is disposed to be substantially symmetrical with the winding conductor 321B with respect to the insulating layer 661B.

Both end portions of the winding conductor 221B are connected to the quartz crystal vibrator 113 by the lead conductor 222B routed to extend from the outer edge toward the center of the top heat insulator 611B.

In this configuration, there is an area where the antenna 210B and the antenna 220B overlap each other in plan view of the wireless thermometer 10B. For example, in this area, an insulating film thinner than a substrate may be placed between the conductors.

In the configuration of the present embodiment, the quartz crystal vibrator 111 and the quartz crystal vibrator 112 are not connected to each other by any conductor. Also, the quartz crystal vibrator 113 and the quartz crystal vibrator 114 are not connected to each other by any conductor. Thus, when a deep temperature is measured, with the quartz crystal vibrators 112 and 114 located on the object side and the quartz crystal vibrators 111 and 113 located on the outside air side, heat from the object is transferred only by the heat insulators 500B and 501B between the quartz crystal vibrator 112 and the quartz crystal vibrator 111 and only by the heat insulator 500B between the quartz crystal vibrator 114 and the quartz crystal vibrator 113. Therefore, a temperature difference between the sensed temperature of the quartz crystal vibrator 111 and the sensed temperature of the quartz crystal vibrator 112 is not affected by any conductor, and is dependent only on the heat insulators 500B and 501B. Also, a temperature difference between the sensed temperature of the quartz crystal vibrator 113 and the sensed temperature of the quartz crystal vibrator 114 is not affected by any conductor, and is dependent only on the heat insulator 500B. Thus, when a deep temperature is measures by using the physical properties of the heat insulators 500B and 501B, the deep temperature can be measured with high accuracy.

In the configuration of the present embodiment, the antennas 210B and 310B overlap each other in plan view, with the thin insulating layer 661B interposed therebetween. This allows the magnetic field coupling between the winding conductor 211B of the antenna 210B and the winding conductor 311B of the antenna 310B and increases the transmission and reception distance.

Additionally, in the configuration of the present embodiment, the antennas 220B and 320B overlap each other, with the thin insulating layer 661B interposed therebetween. This allows the magnetic field coupling between the winding conductor 221B of the antenna 220B and the winding conductor 321B of the antenna 320B and increases the transmission and reception distance. Moreover, making the winding conductors 211B, 221B, 321B, and 322B close together allows their magnetic field coupling and further increases the transmission and reception distance.

Also, with the configuration of the present embodiment, a deep temperature can be detected from each set of a plurality of types of quartz crystal vibrators having different heat transfer paths. Thus, by using, for example, an average of a plurality of detected deep temperatures, measurement errors can be reduced and the deep temperature can be measured with higher accuracy.

Figure 5:
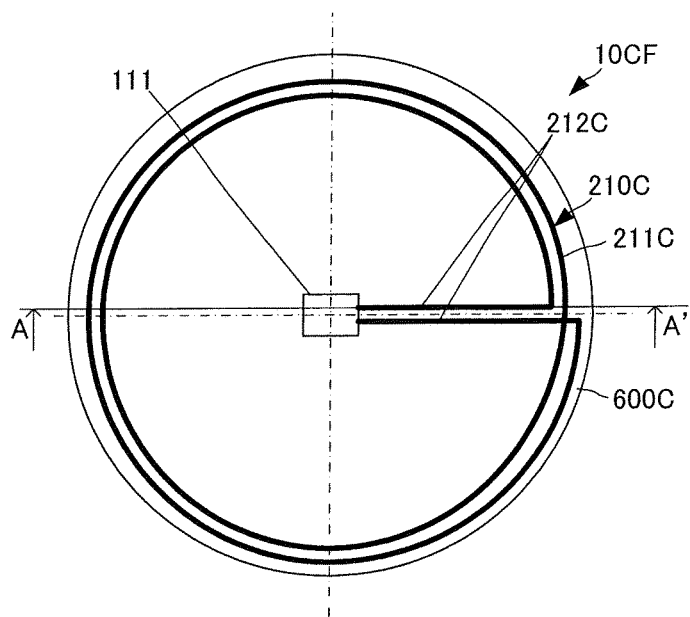
FIG. 5(A) to FIG. 5(C) illustrate configurations of a base member 10CF of a wireless thermometer according to a fourth embodiment of the present invention.
Figure 5:
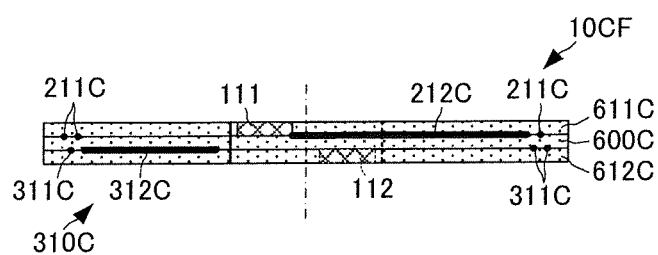
Figure 5:
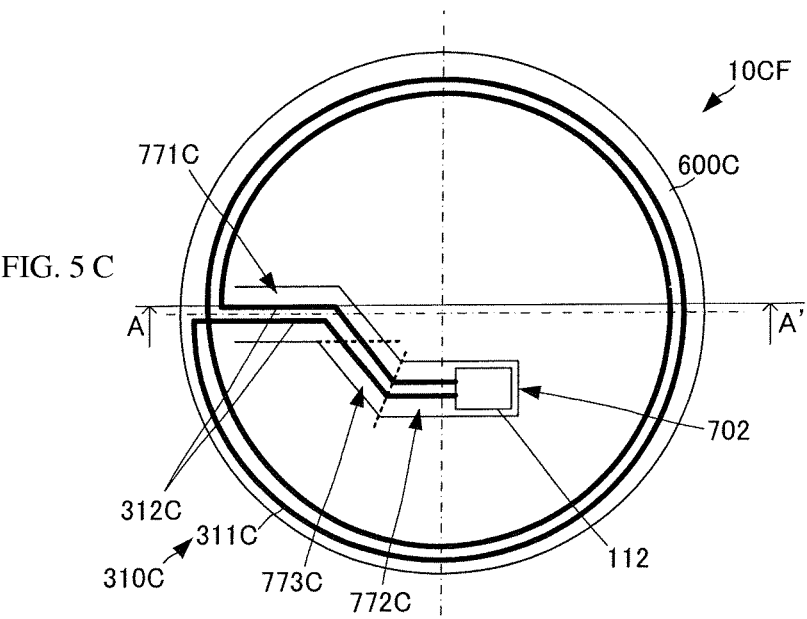
Figure 6:
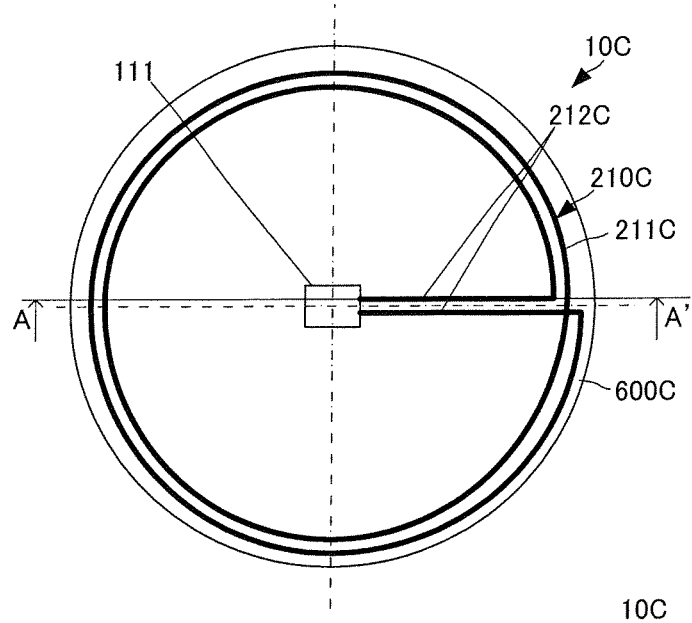
FIG. 6(A) to FIG. 6(C) illustrate configurations of a wireless thermometer 10C according to the fourth embodiment of the present invention.
Figure 6:
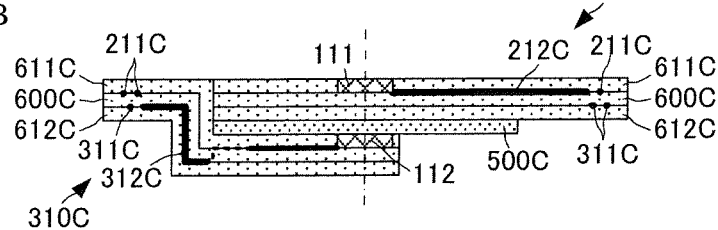
Figure 6:
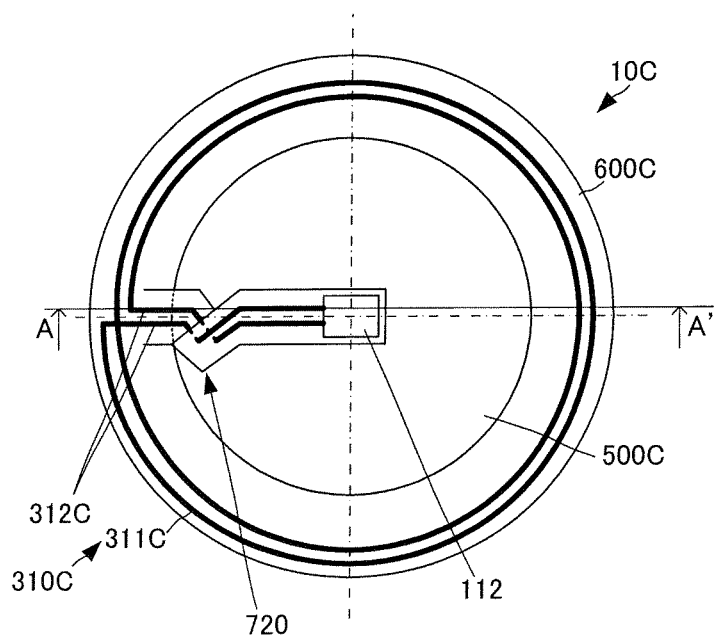

A wireless thermometer according to a fourth embodiment of the present invention will now be described with reference to the drawings. FIG. 5 illustrates a configuration of a base member 10CF of the wireless thermometer according to the fourth embodiment of the present invention. FIG. 5(A) is a top view with a top heat insulator 611C omitted, FIG. 5(B) is a cross-sectional view taken along line A-A' of FIGS. 5(A) and 5(C), and FIG. 5(C) is a bottom view with a bottom heat insulator 612C omitted. FIG. 6 illustrates a configuration of a wireless thermometer 10C according to the fourth embodiment of the present invention. FIG. 6(A) is a top view with the top heat insulator 611C omitted, FIG. 6(B) is a cross-sectional view taken along line A-A' of FIGS. 6(A) and 6(C), and FIG. 6(C) is a bottom view with the bottom heat insulator 612C omitted. The quartz crystal vibrators 111 and 112 are the same as the quartz crystal vibrators in the embodiments described above, and thus their detailed description will be omitted.

The base member 10CF includes a substrate 600C having flexibility and insulating properties. The substrate 600C is circular in plan view and is in the shape of a thin film. The quartz crystal vibrator 111 and an antenna 210C are disposed on a principal surface (shown in FIG. 5(A)) of the substrate 600C. The quartz crystal vibrator 111 is located at substantially the center of the base member 10CF in plan view. The antenna 210C includes a winding conductor 211C and a lead conductor 212C. The winding conductor 211C is a conductor wound along the outer edge of the substrate 600C, and is formed near the outer edge of the substrate 600C.

The quartz crystal vibrator 111 and the winding conductor 211C are connected to each other by the lead conductor 212C. The lead conductor 212C extends linearly along the radial direction of the winding conductor 211C.

The quartz crystal vibrator 112 and an antenna 310C are disposed on the other principal surface (shown in FIG. 5(C)) of the substrate 600C. The antenna 310C includes a winding conductor 311C and a lead conductor 312C. The winding conductor 311C is a conductor wound along the outer edge of the substrate 600C, and is formed near the outer edge of the substrate 600C. The winding conductor 311C is disposed to be substantially symmetrical with the winding conductor 211C with respect to the substrate 600C. That is, the shape (length) of the lead conductor 212C is determined in accordance with this configuration.

The quartz crystal vibrator 112 and the winding conductor 311C are connected to each other by the lead conductor 312C. The lead conductor 312C is disposed not to overlap with the winding conductor 212C in plan view of the substrate 600C. A first end region 771C serving as an end portion of the lead conductor 312C, the end portion being connected to the winding conductor 311C, extends in parallel with the radial direction of the winding conductor 311C. A second end region 772C serving as an end portion of the lead conductor 312C, the end portion being connected to the quartz crystal vibrator 112, extends in parallel with the first end region 771C. A central region 773C that connects the first end region 771C and the second end region 772C extends in a direction that forms a predetermined angle with respect to the direction in which the first end region 771C and the second end region 772C extend.

In this configuration, the quartz crystal vibrator 112 is disposed such that when the base member 10CF is folded to sandwich a heat insulator 500C as illustrated in FIG. 6, the quartz crystal vibrator 112 is located at substantially the center of the heat insulator 500C in plan view. That is, the shape (length or bent shape) of the lead conductor 312C is determined in accordance with this configuration.

The top heat insulator 611C is formed over one entire principal surface of the base member 10CF, and the bottom heat insulator 612C is formed substantially the entire other principal surface of the base member 10CF.

The base member 10CF is provided with a cut 702. The cut 702 extends to surround the quartz crystal vibrator 112 and the lead conductor 312C in plan view of the base member 10CF. The cut 702 does not extend to an end of the lead conductor 312C, the end being adjacent to the winding conductor 311C.

The wireless thermometer 10C is obtained, as illustrated in FIG. 6, by sandwiching the disk-shaped heat insulator 500C with the base member 10CF having the above-described shape. More specifically, an inside portion of the cut 702 in the base member 10CF is separated from a region where there are the winding conductors 211C and 311C. After the heat insulator 500C is placed on the other principal surface side of the substrate 600C, the inside portion of the cut 702 is placed on the surface of the heat insulator 500C opposite the substrate 600C. More specifically, the first end region 771C in the inside portion of the cut 702 is folded twice to follow the side face of the heat insulator 500C placed. Thus, the second end region 772C in the inside portion of the cut 702 is placed on a surface opposite the quartz crystal vibrator 111, with the heat insulator 500C interposed therebetween.

Additionally, the central region 773C in the inside portion of the cut 702 is folded as illustrated in FIG. 6(C). The central region 773C is folded such that the quartz crystal vibrator 112 is located at substantially the center of the heat insulator 500C. Although not shown, if there is a possibility that conductors may be brought into contact with each other during folding, a thin insulating film may be placed between the conductors.

With this configuration, in the wireless thermometer 10C, the quartz crystal vibrators 111 and 112 can be made to be overlapped with each other at the center of the wireless thermometer 10C in plan view. Thus, a wireless thermometer having the same configuration as that in the first embodiment can be formed out of a single substrate. That is, the components of the wireless thermometer can be simplified while the same functions and effects as those of the wireless thermometer 10 of the first embodiment can be achieved. This makes it possible, for example, to lower the cost.

Although only the side of the quartz crystal vibrator 112 has a folded structure in the present embodiment, the side of the quartz crystal vibrator 111 may also have a folded structure. However, when the side of the quartz crystal vibrator 112 has a folded structure and is located on the object side as illustrated in FIG. 6, the antennas can be located on the outside air side and the antennas and the object can be made distant from each other. This can reduce the effects of the object on the antennas.

The cut 702 may be formed not only to surround the quartz crystal vibrator 112 and the lead conductor 312C, but may also be formed along the inside of the winding conductor 311C to cut out the antenna central portion. The cut 702 may be formed not only on the side of the quartz crystal vibrator 112, but also on the side of the quartz crystal vibrator 111 in the same manner. That is, the cut 702 may be formed along the inside of the winding conductor 211C to cut out the antenna central portion.

Figure 7:
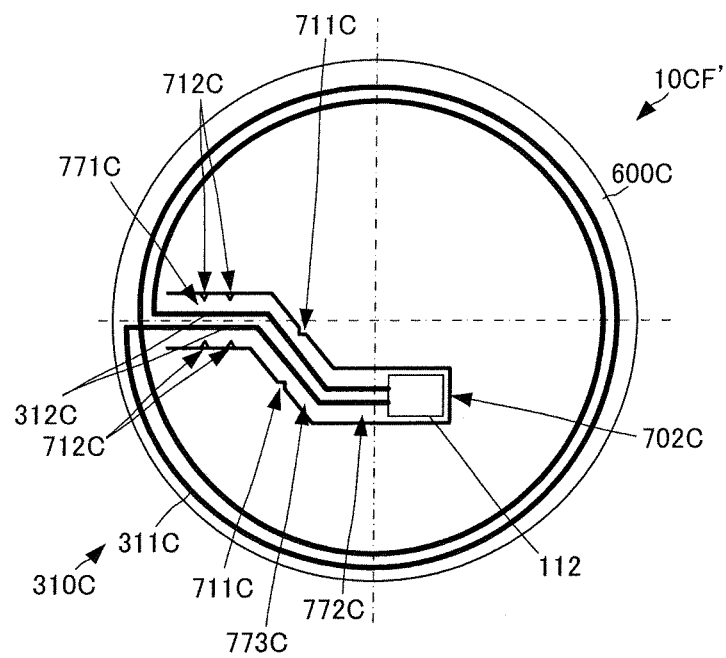
FIG. 7 illustrates a configuration of a base member 10CF' of a wireless thermometer according to a fifth embodiment of the present invention.

A wireless thermometer according to a fifth embodiment of the present invention will now be described with reference to the drawings. FIG. 7 illustrates a configuration of a base member 10CF' of the wireless thermometer according to the fifth embodiment of the present invention. FIG. 7 is a bottom view with the bottom heat insulator 612C omitted. The base member 10CF' of the wireless thermometer of the present embodiment differs from the base member 10CF of the wireless thermometer according to the fourth embodiment in the shape of the inside portion separated by the cut 702. The other parts are the same as those of the base member 10CF of the wireless thermometer according to the fourth embodiment, and thus only different parts will be described.

The central region 773C in the inside portion separated by the cut 702 is provided with indentations 711C cut into the substrate 600C. The indentations 711C are formed such that when the inside portion separated by the cut 702 is folded by using the indentations 711C, the quartz crystal vibrator 112 is located at substantially the center of the heat insulator 500C. The first end region 771C in the inside portion separated by the cut 702 is also provided with indentations 712C. The indentations 712C are formed such that when the inside portion separated by the cut 702 is folded by using the indentations 712C, a part of the inside portion separated by the cut 702 is placed along the side face of the heat insulator 500C.

With the indentations 711C and 712C, the folding operation for positioning the quartz crystal vibrator 112 at a predetermined position can be easily done during manufacture of the wireless thermometer. Also, the quartz crystal vibrator 112 can be accurately and easily positioned at the predetermined position.

Figure 8:
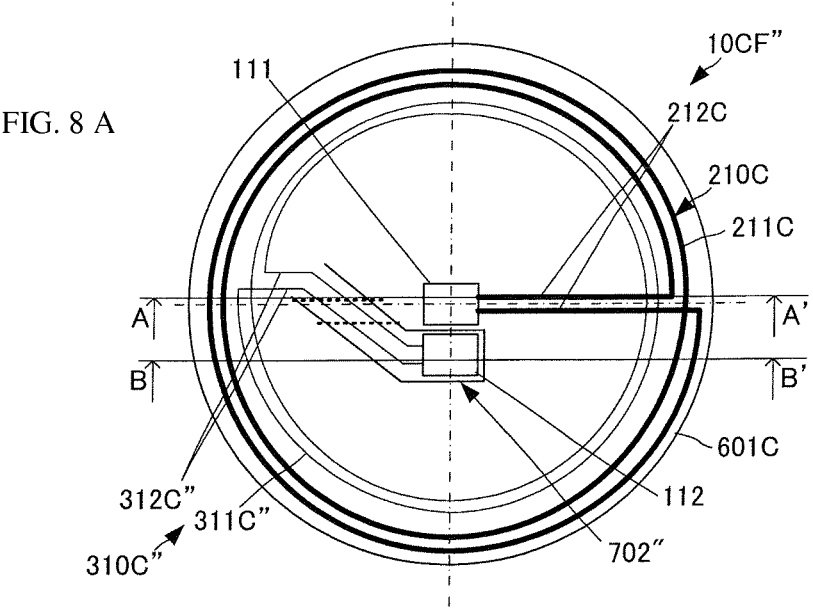
FIG. 8(A) to FIG. 8(E) illustrate configurations of a base member 10CF" of a wireless thermometer, a wireless thermometer 10C", and a wireless thermometer 10CC according to a sixth embodiment of the present invention.
Figure 8:
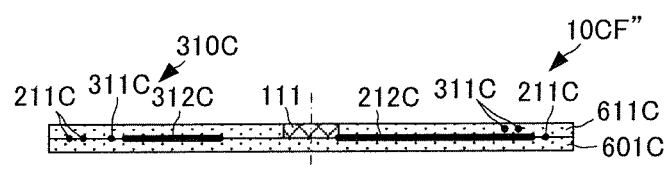
Figure 8:
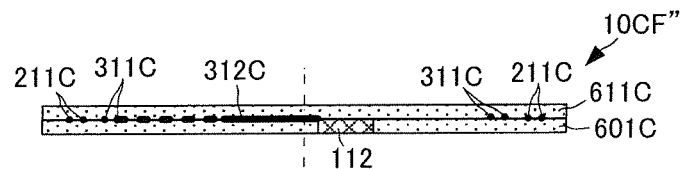
Figure 8:
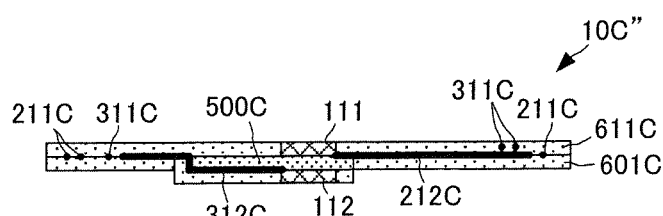
Figure 8:
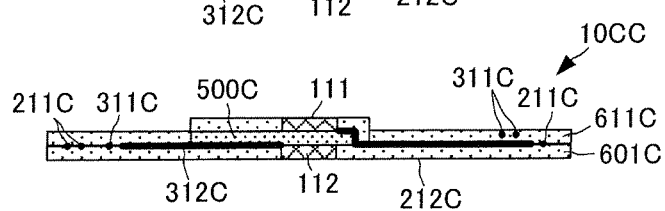

A wireless thermometer according to a sixth embodiment will now be described with reference to the drawings. FIG. 8 illustrates configurations of a base member 10CF" of the wireless thermometer and wireless thermometers 10C" and 10CC according to the sixth embodiment of the present invention. FIG. 8(A) is a top view with the top heat insulator 611C omitted, FIG. 8(B) is a cross-sectional view taken along line A-A' of FIG. 8(A), and FIG. 8(C) is a cross-sectional view taken along line B-B' of FIG. 8(A). FIG. 8(D) is a cross-sectional view illustrating the configuration of the wireless thermometer 10C" including the base member 10CF"'. FIG. 8(E) is a cross-sectional view illustrating the configuration of the wireless thermometer 10CC.

In the wireless thermometer 10C" and the base member 10CF" of the present embodiment, the antennas 210C and 310C are formed on a side of the substrate 601C, the side being adjacent to the top heat insulator 611C.

The substrate 601C has flexibility and insulating properties. The substrate 601C is circular in plan view and is in the shape of a thin film. The quartz crystal vibrator 111 is disposed at substantially the center of the substrate 601C in plan view. The quartz crystal vibrator 111 is disposed in the top heat insulator 611C on the substrate 601C. The quartz crystal vibrator 111 is connected to the antenna 210C.

The antenna 210C includes the winding conductor 211C and the lead conductor 212C. The winding conductor 211C and the lead conductor 212C have the same structure as that in the fifth embodiment. The winding conductor 211C and the lead conductor 212C are disposed in the top heat insulator 611C on the substrate 601C.

An antenna 310C" includes a winding conductor 311C" and a lead conductor 312C". The winding conductor 311C" and the lead conductor 212C" are also disposed in the top heat insulator 611C on the substrate 601C. The winding conductor 311C" is formed inside the winding conductor 211C. The winding conductor 311C" and the winding conductor 211C are arranged close to each other to an extent which allows magnetic field coupling therebetween during transmission to and reception from an external device using the winding conductors. As in the fourth embodiment, the lead conductor 312C" is bent in the middle in plan view.

The quartz crystal vibrator 112 is disposed in the substrate 601C of the top heat insulator 611C. The quartz crystal vibrator 112 is connected to the lead conductor 312C" of the antenna 310C".

The base member 10CF" is provided with a cut 702". The cut 702" extends to surround the quartz crystal vibrator 112 and the lead conductor 312C" in plan view of the base member 10CF".

The base member 10CF" including the lead conductor 312C" having a bent portion in the middle is used, and the bent portion of the lead conductor 312C" is folded along two wavy lines in FIG. 8(A). Thus, as illustrated in FIG. 8(D), a bent middle portion of an inside region surrounded by the cut 702" is in contact with the side face of the heat insulator 500C. As illustrated in FIG. 8(D), a side of the inside region surrounded by the cut 702", the side being adjacent to the quartz crystal vibrator 112, is disposed in the surface opposite the quartz crystal vibrator 111 with the heat insulator 500C interposed therebetween. By appropriately setting the shape and the folding positions of the lead conductor 312C", the quartz crystal vibrator 112 can be placed at a position opposite the quartz crystal vibrator 111 with the heat insulator 500C interposed therebetween.

Thus, even when the antennas do not overlap in plan view, the same functions and effects as those of the above-described embodiments can be achieved if the antennas are arranged close to each other in the same plane. A plurality of antennas are arranged in the same plane in the present embodiment. However, as long as a plurality of antennas are arranged in substantially the same plane, the coupling between these antennas can be achieved, and again, the same functions and effects as those of the above-described embodiments can be achieved.

The cut 702" may be formed not only to surround the quartz crystal vibrator 112 and the lead conductor 312C" in plan view of the base member 10CF", but may also be formed along the inside of the winding conductor 311C" to cut out the antenna central portion.

In the configuration of the present embodiment, all the antennas are formed on one side of the substrate. This can facilitate the antenna forming process. Additionally, the antennas 210C and 310C and the lead conductors 212C and 312C" can be integrally formed and cut out. This can simplify the manufacturing process and reduce the manufacturing cost.

FIGS. 8(A) to 8(D) illustrate a structure where the side of the quartz crystal vibrator 112 is folded to wrap around the lower side of the heat insulator 500C. Alternatively, as illustrated in FIG. 8(E), the side of the quartz crystal vibrator 111 may be folded to wrap around the upper side of the heat insulator 500C. In this case, a surface to be in contact with the object becomes flat.

In the configuration of the present embodiment, the antennas connected to the respective quartz crystal vibrators facing each other, with the heat insulator interposed therebetween, are formed on the same surface. This configuration is applicable to other embodiments to be described below.

Figure 9:
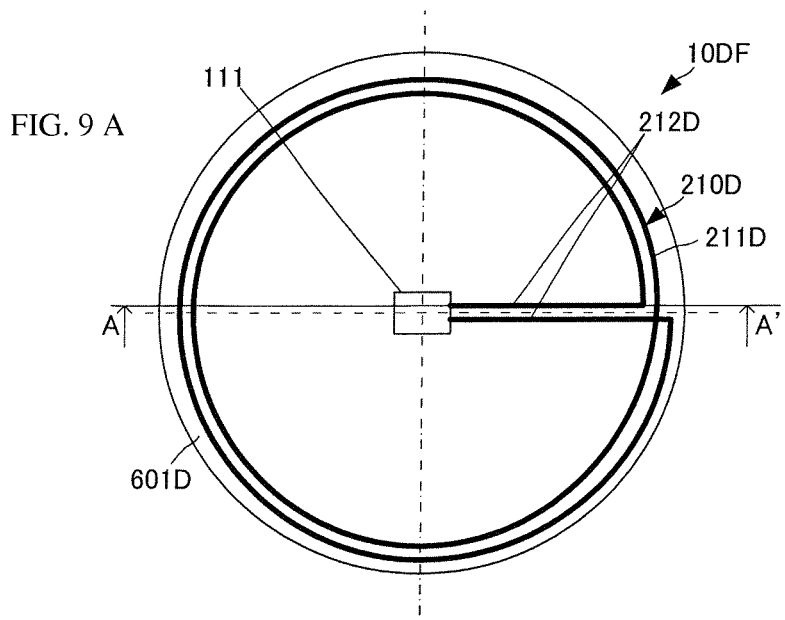
FIG. 9(A) to FIG. 9(C) illustrate configurations of a base member 10DF of a wireless thermometer according to a seventh embodiment of the present invention.
Figure 9:
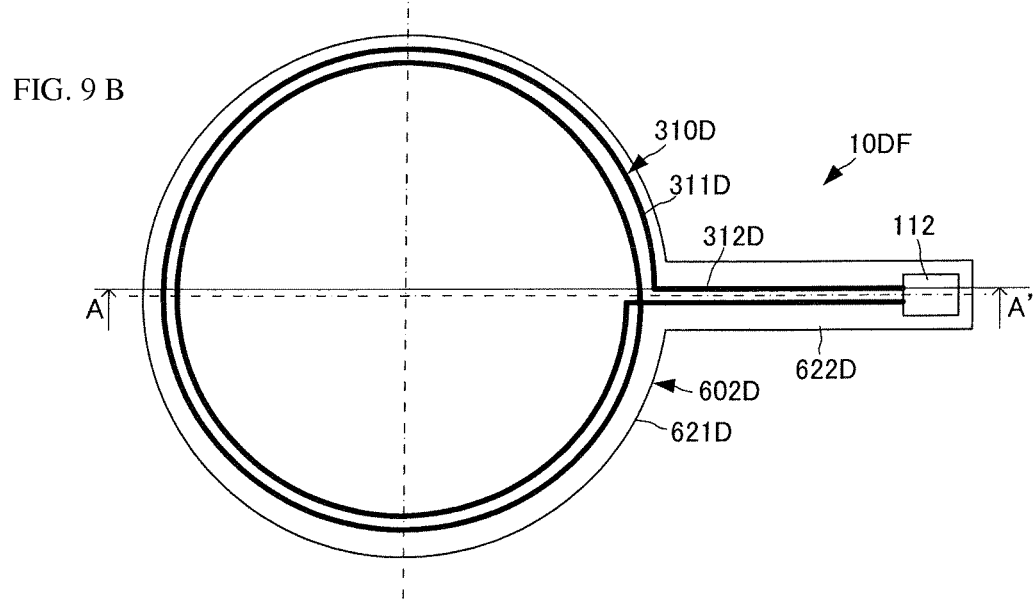
Figure 9:
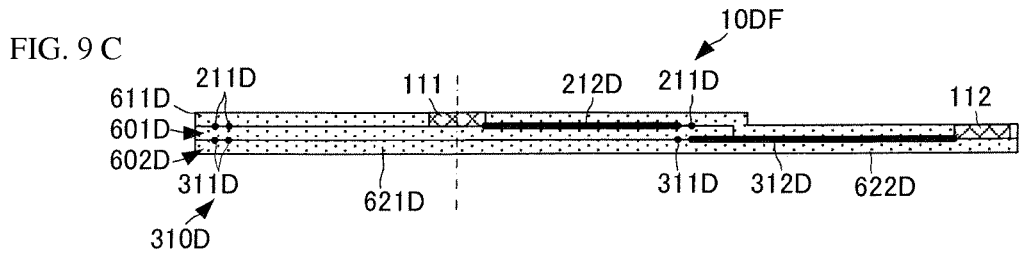
Figure 10:
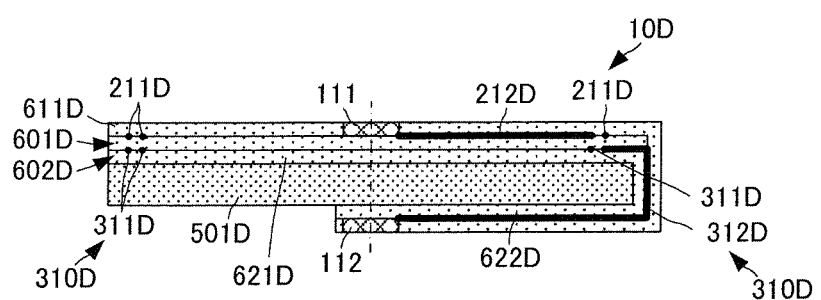
FIG. 10 is a lateral cross-sectional view of a wireless thermometer 10D according to the seventh embodiment of the present invention.

A wireless thermometer according to a seventh embodiment will now be described with reference to the drawings. FIG. 9 illustrates a configuration of a base member 10DF of the wireless thermometer according to the seventh embodiment of the present invention. FIG. 9(A) is a top view with a top heat insulator 611D omitted, FIG. 9(B) is a top view with the top heat insulator 611D omitted, and FIG. 9(C) is a cross-sectional view taken along line A-A' of FIGS. 9(A) and 9(B). FIG. 10 illustrates a configuration of a wireless thermometer 10D according to the seventh embodiment of the present invention. FIG. 10 is a lateral cross-sectional view of the wireless thermometer 10D. The quartz crystal vibrators 111 and 112 are the same as those in the embodiments described above, and thus their detailed description will be omitted.

The base member 10DF includes a substrate 601D having flexibility and insulating properties. The substrate 601D is circular in plan view and is in the shape of a thin film. The quartz crystal vibrator 111 and an antenna 210D are disposed on a principal surface (shown in FIG. 9(A)) of the substrate 601D. The quartz crystal vibrator 111 is located at substantially the center of the base member 10DF in plan view. The antenna 210D includes a winding conductor 211D and a lead conductor 212D. The winding conductor 211D is a conductor wound along the outer edge of the substrate 601D, and is formed near the outer edge of the substrate 601D.

The quartz crystal vibrator 111 and the winding conductor 211D are connected to each other by the lead conductor 212D. The lead conductor 212D extends linearly along the radial direction of the winding conductor 211D.

A substrate 602D is disposed on a surface of the substrate 601D, the surface being opposite the surface where the quartz crystal vibrator 111 and the antenna 210D are disposed. The substrate 602D has a circular main portion 621D and an elongated portion 622D in plan view. The main portion 621D has the same shape as the substrate 601D in plan view. The main portion 621D is disposed to be overlapped with the substrate 601D. The elongated portion 622D is connected to the main portion 621D such that its longitudinal direction is the radial direction of the main portion 621D. The length of the elongated portion 622D in the longitudinal direction thereof is determined such that when the elongated portion 622D is folded toward the main portion 621D to sandwich a heat insulator 500D therebetween, an end portion of the elongated portion 622D is located at substantially the center of the main portion 421D, the heat insulator 500D, and the substrate 601D in plan view.

The quartz crystal vibrator 112 is located near an end portion of the elongated portion 622D, the end portion being opposite the portion connected to the main portion 621D. The quartz crystal vibrator 112 is disposed on a surface of the elongated portion 422D, the surface being adjacent to the substrate 601D.

An antenna 310D includes a winding conductor 311D and a lead conductor 312D. The winding conductor 311D is a conductor wound along the outer edge of the main portion 621D of the substrate 602D, and is formed near the outer edge of the main portion 621D. The diameter of the winding conductor 311D is set in accordance with the resonance frequency band of the quartz crystal vibrator 112. The winding conductor 311D is disposed to be substantially symmetrical with the winding conductor 211D with respect to the substrate 601D.

The lead conductor 312D connects the quartz crystal vibrator 112 and the winding conductor 311D. The lead conductor 312D is formed on a surface of the elongated portion 622D, the surface being adjacent to the substrate 601D.

The top heat insulator 611D is disposed on substantially the entire surface of the substrate 601D opposite the substrate 602D and on substantially the entire surface of the elongated portion 622D of the substrate 602D adjacent to the substrate 601D.

By folding the elongated portion 622D in the base member 10DF having the structure described above, the heat insulator 500D is sandwiched between the main portion 621D and the elongated portion 622D as illustrated in FIG. 10. The elongated portion 622D is folded to come into contact with the side face of the heat insulator 500D. The wireless thermometer 10D is thus obtained. When the length of the elongated portion 622D and the position of the quartz crystal vibrator 112 are as described above, the quartz crystal vibrator 112 is overlapped with the quartz crystal vibrator 111 in plan view of the wireless thermometer 10D and the heat insulator 500D.

Even with this structure, the same functions and effects as those of the first embodiment can be achieved. Also, as in the fifth embodiment, a wireless thermometer having a simple structure can be obtained. In the configuration of the present embodiment, since folding is done such that portions on the substrate side of the lead conductor 312D face each other, a short circuit during the folding can be prevented. It is thus possible to prevent a short circuit in the lead conductor without adding any insulating layer.

Although the heat insulator 500D is sandwiched in the above description of the present embodiment (FIG. 10), the heat insulator 500D may be omitted. In this case, the overlapping regions of the substrate 602D serve as a substitute for the heat insulator. This can further reduce the number of components.

Figure 11:
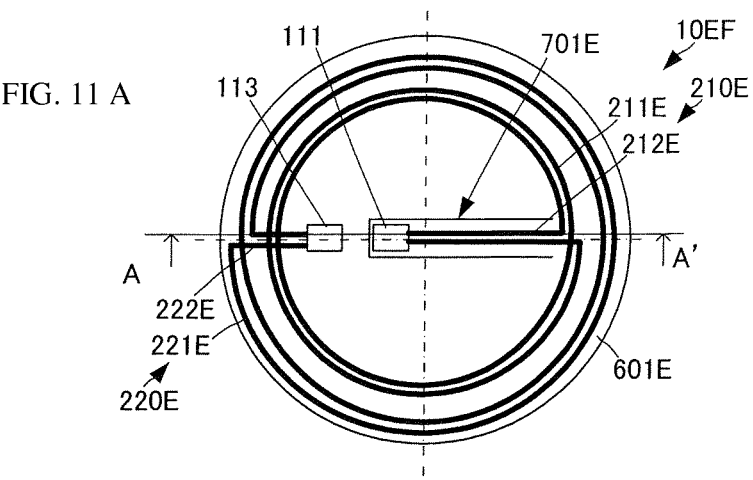
FIG. 11(A) to FIG. 11(C) illustrate configurations of a base member 10EF of a wireless thermometer according to an eighth embodiment of the present invention.
Figure 11:
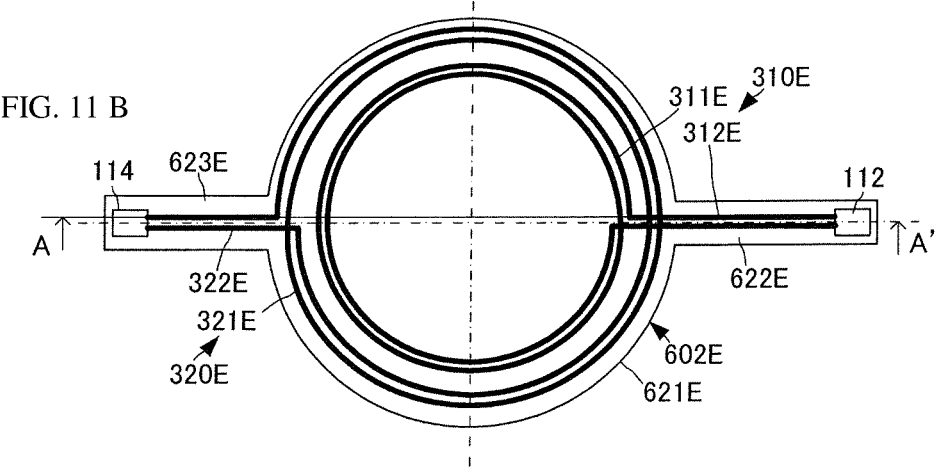
Figure 11:
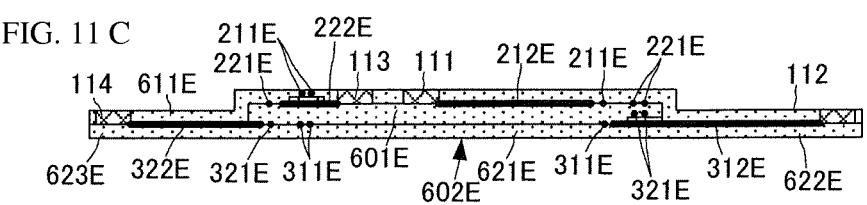
Figure 12:
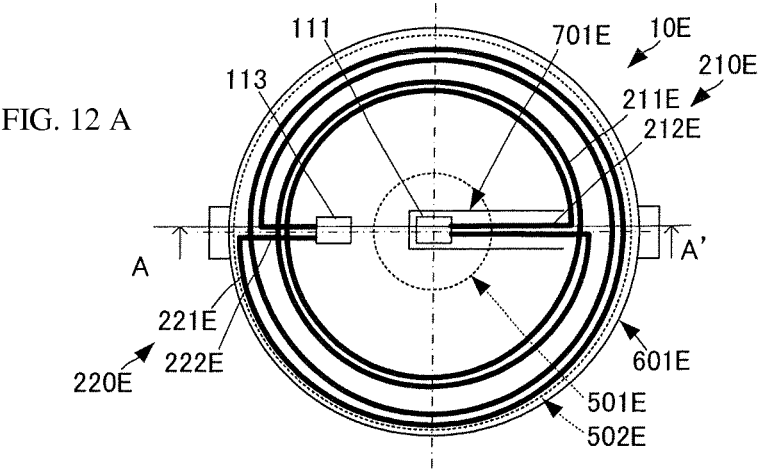
FIG. 12(A) to FIG. 12(C) illustrate configurations of a wireless thermometer 10E according to the eighth embodiment of the present invention.
Figure 12:
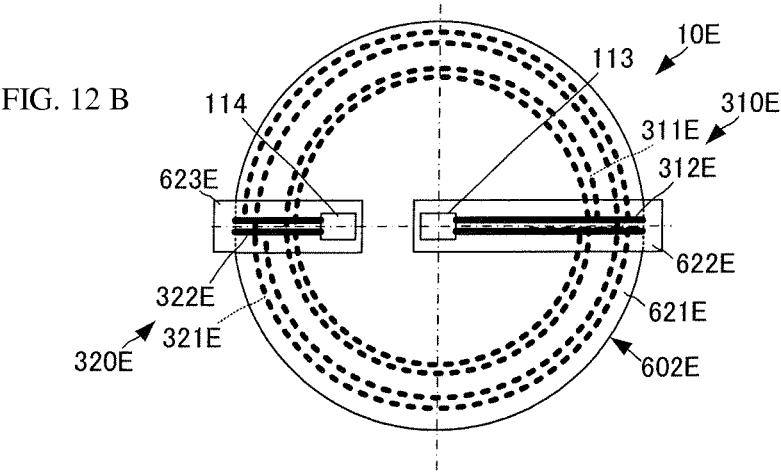
Figure 12:
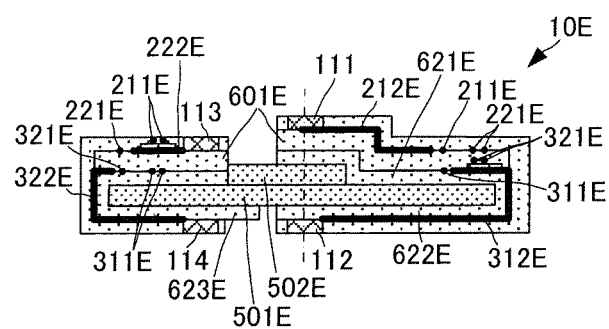

A wireless thermometer according to an eighth embodiment will now be described with reference to the drawings. FIG. 11 illustrates a configuration of a base member 10EF of the wireless thermometer according to the eighth embodiment of the present invention. FIG. 11(A) is a top view with a top heat insulator 611E omitted, FIG. 11(B) is a top view with the top heat insulator 611E and a substrate 601E omitted, and FIG. 11(C) is a cross-sectional view taken along line A-A' of FIGS. 11(A) and 11(B). FIG. 12 illustrates a configuration of a wireless thermometer 10E according to the eighth embodiment of the present invention. FIG. 12(A) is a top view with the top heat insulator 611E omitted, FIG. 12(B) is a bottom view with the top heat insulator 611E omitted, and FIG. 12(C) is a cross-sectional view taken along line A-A' of FIGS. 11(A) and 11(B). The quartz crystal vibrators 111, 112, 113, and 114 are the same as those in the embodiments described above, and thus their detailed description will be omitted.

The base member 10EF includes the substrate 601E having flexibility and insulating properties. The substrate 601E is circular in plan view and is in the shape of a thin film. The quartz crystal vibrators 111 and 113 and antennas 210E and 220E are disposed on a principal surface (shown in FIG. 11(A)) of the substrate 601E. The quartz crystal vibrators 111 and 113 are spaced apart by a predetermined distance in plan view of the base member 10EF. The quartz crystal vibrator 111 is disposed to be located at the center of heat insulators 501E and 502E (described below), with the heat insulators 501E and 502E sandwiched (as illustrated in FIG. 12).

The antenna 210E includes a winding conductor 211E and a lead conductor 212E. The winding conductor 211E is a conductor wound along the outer edge of the substrate 601E, and is formed near the outer edge of the substrate 601E.

The quartz crystal vibrator 111 and the winding conductor 211E are connected to each other by the lead conductor 212E. The lead conductor 212E extends linearly along the radial direction of the winding conductor 211E.

The antenna 220E includes a winding conductor 221E and a lead conductor 222E. The winding conductor 221E is a conductor wound along the outer edge of substrate 601E, and is formed near the outer edge of the substrate 601E. The winding conductor 221E is spaced inwardly from the winding conductor 211E by a predetermined distance.

The quartz crystal vibrator 113 and the winding conductor 221E are connected to each other by the lead conductor 222E. The lead conductor 222E extends linearly along the radial direction of the winding conductor 221E.

A substrate 602E is disposed on a surface of the substrate 601E, the surface being opposite the surface where the quartz crystal vibrators 111 and 113 and the antennas 210E and 221E are disposed. The substrate 602E has a circular main portion 621E and elongated portions 622E and 623E in plan view. The main portion 621E has the same shape as the substrate 601E in plan view. The main portion 621E is disposed to be overlapped with the substrate 601E.

The elongated portion 622E is connected to the main portion 621E such that its longitudinal direction is the radial direction of the main portion 621E. The length of the elongated portion 622E in the longitudinal direction thereof is determined such that when the elongated portion 622E is folded toward the main portion 621E to sandwich the heat insulators 501E and 502E therebetween, an end portion of the elongated portion 622E is located at substantially the center of the main portion 621E, the heat insulators 501E and 502E, and the substrate 601E in plan view.

The quartz crystal vibrator 112 is located near an end portion of the elongated portion 622E, the end portion being opposite the portion connected to the main portion 621E. The quartz crystal vibrator 112 is disposed on a surface of the elongated portion 622E, the surface being adjacent to the substrate 601E.

An antenna 310E includes a winding conductor 311E and a lead conductor 312E. The winding conductor 311E is a conductor wound along the outer edge of the main portion 621E of the substrate 602E, and is formed near the outer edge of the main portion 621E. The winding conductor 311E is disposed to be substantially symmetrical with the winding conductor 211E with respect to the substrate 601E.

The lead conductor 312E connects the quartz crystal vibrator 112 and the winding conductor 311E. The lead conductor 312E is formed on a surface of the elongated portion 622E, the surface being adjacent to the substrate 601E.

The elongated portion 623E is connected to the main portion 621E such that its longitudinal direction is the radial direction of the main portion 621E. In plan view of the substrate 602E, the elongated portion 623E is disposed on the opposite side across the main portion 621E. The length of the elongated portion 623E in the longitudinal direction thereof is determined such that when the elongated portion 623E is folded toward the main portion 621E to sandwich the heat insulators 501E and 502E therebetween, an end portion of the elongated portion 623E is located at substantially the center of the main portion 421E, the heat insulators 501E and 502E, and the substrate 601E in plan view.

The quartz crystal vibrator 114 is located near an end portion of the elongated portion 623E, the end portion being opposite the portion connected to the main portion 621E. The quartz crystal vibrator 114 is disposed on a surface of the elongated portion 623E, the surface being adjacent to the substrate 601E.

An antenna 320E includes a winding conductor 321E and a lead conductor 322E. The winding conductor 321E is a conductor wound along the outer edge of the main portion 621E of the substrate 602E, and is formed near the outer edge of the main portion 621E. The winding conductor 321E is spaced inwardly from the winding conductor 311E by a predetermined distance. The winding conductor 321E is disposed to be substantially symmetrical with the winding conductor 221E with respect to the substrate 601E.

The lead conductor 322E connects the quartz crystal vibrator 114 and the winding conductor 321E. The lead conductor 322E is formed on a surface of the elongated portion 623E, the surface being adjacent to the substrate 601E.

The top heat insulator 611E is disposed on substantially the entire surface of the substrate 601E opposite the substrate 602E and on substantially the entire surfaces of the elongated portions 622E and 623E of the substrate 602E adjacent to the substrate 601E.

The base member 10EF is provided with a cut 701E. The cut 701E extends to surround the quartz crystal vibrator 111 and the lead conductor 212E in plan view of the base member 10EF. The cut 701E does not extend to an end of the lead conductor 212E, the end being adjacent to the winding conductor 211E.

By folding the elongated portions 622E and 623E in the base member 10EF having the structure described above, the heat insulator 501E is sandwiched between the main portion 621E and the elongated portions 622E and 623E as illustrated in FIG. 12. The elongated portions 622E and 623E are folded to come into contact with the side face of the heat insulator 501E. Also, by folding the inside region of the cut 701E, the heat insulator 502E is sandwiched between the inside region of the cut 701E and the heat insulator 501E. The heat insulator 502E is smaller in diameter than the heat insulator 501E, and is sized not to overlap the quartz crystal vibrator 113 on the substrate 601E in plan view of the wireless thermometer 10E. The wireless thermometer 10E is formed with this configuration.

When the length of the elongated portion 622E, the position of the quartz crystal vibrator 112, the position of the quartz crystal vibrator 111, and the shape of the winding conductor 211E are as described above, the quartz crystal vibrator 112 is overlapped with the quartz crystal vibrator 111, with the wireless thermometer 10E and the heat insulators 501E and 502E interposed therebetween. Also, when the length of the elongated portion 623E and the position of the quartz crystal vibrator 114 are as described above, the quartz crystal vibrator 114 is overlapped with the quartz crystal vibrator 113, with the wireless thermometer 10E and the heat insulator 501E interposed therebetween.

Even with this structure, the same functions and effects as those of the third embodiment can be achieved. Also, as in the fifth and sixth embodiments described above, a wireless thermometer having a simple configuration can be obtained.

In the configuration of the present embodiment, the annular conductors 211E, 221E, 311E, and 321E are arranged inside the outer edge of the heat insulator 501E in plan view as illustrated in FIG. 12. Alternatively, as in the third embodiment, the annular conductors 211E, 221E, 311E, and 321E may be arranged outside the outer edge of the heat insulator 501E in plan view.

A folded structure formed by providing a cut is not limited to that described in any predetermined embodiment, and may be any structure as long as the quartz crystal vibrators disposed with a heat insulator interposed therebetween after folding are substantially symmetrical with respect to the heat insulator. For example, the structures illustrated in FIGS. 13 and 14 may be used, which are derived from the third embodiment.

Figure 13:
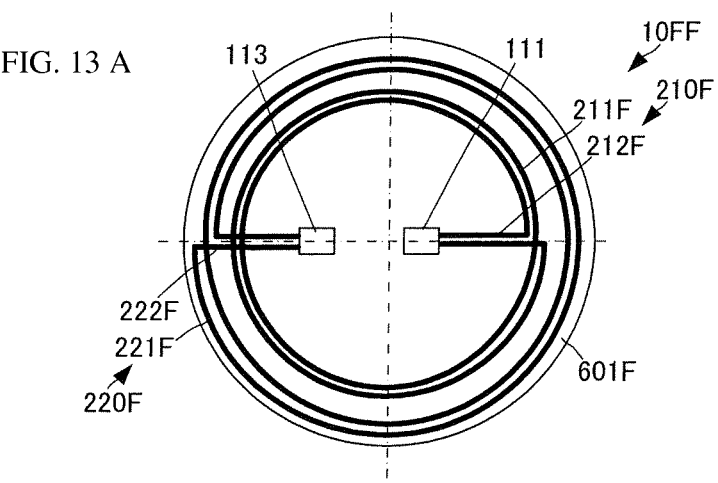
FIG. 13(A) to FIG. 13(B) illustrate configurations of a base member 10FF of a wireless thermometer according to a ninth embodiment of the present invention.
Figure 13:
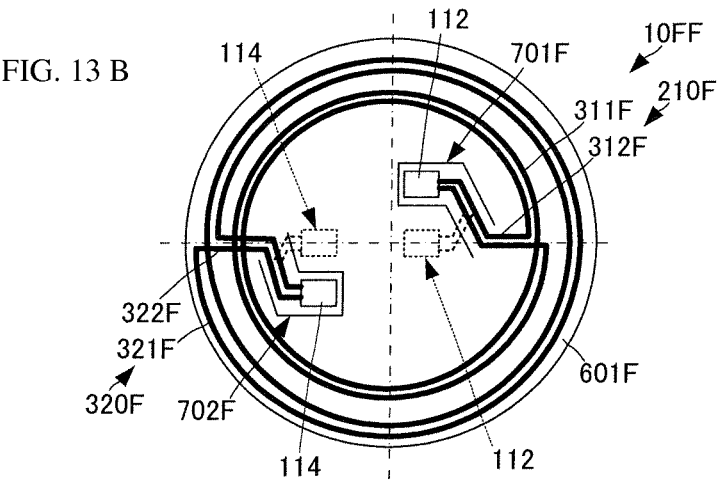

FIG. 13 illustrates a configuration of a base member 10FF of a wireless thermometer according to a ninth embodiment of the present invention. FIG. 13(A) is a top view with a top heat insulator omitted, and FIG. 13(B) is a bottom view with a bottom heat insulator omitted. In this configuration, the quartz crystal vibrators 112 and 114 are provided with cuts 701F and 702F, respectively. The shape of the cuts 701F and 702F in plan view is the same as that of the cut 702 in the third embodiment. Even with this structure, the same functions and effects as those of the third embodiment can be achieved. Additionally, this structure facilitates the design work, because the quartz crystal vibrators 112 and 114 can be arranged in various ways.

FIG. 14 illustrates a configuration of a base member 10GF of a wireless thermometer according to a tenth embodiment of the present invention. FIG. 14(A) is a top view with a top heat insulator omitted, and FIG. 14(B) is a bottom view with a bottom heat insulator omitted. In this configuration, lead conductors 312G and 322G are formed to have a predetermined angle with respect to the radial direction of annular conductors 311G and 321G. Even with this configuration, by folding the inside regions of cuts 701G and 702G, the quartz crystal vibrators 111 and 112 can be symmetrically arranged with respect to the heat insulators and the quartz crystal vibrators 113 and 114 can be symmetrically arranged with respect to the heat insulators. Such a folded structure may be used.

Although quartz crystal vibrators have been described as an example in the embodiments above, they may be other types of resonators. For example, surface acoustic wave resonators may be used as long as they are piezoelectric resonators having large frequency temperature characteristics. Particularly when surface acoustic wave resonators are used, it is easier, than with quartz crystal vibrators, to adjust the resonance frequency to a high frequency which makes it possible to reduce the size of a radio wave communication antenna for the UHF band or the like. This facilitates manufacture of the wireless thermometer that performs wireless communication using radio waves. The resonators used may be elements that start to resonate in response to a radio signal from the outside. Thus, the wireless thermometer does not need to be provided with a power supply for driving the resonators, and it is possible to reduce the size of the wireless thermometer. The resonators may be formed on a Si layer by using a MEMS technique. RFID-ICs having temperature sensors may be used instead of the resonators.

In the embodiments described above, quartz crystal vibrators are disposed inside the winding conductor in plan view in the final form of the wireless thermometer, but the quartz crystal vibrators may be disposed outside the winding conductor. The size of the wireless thermometer can be reduced, however, when the quartz crystal vibrators are disposed inside the winding coil electrode.

In the wireless thermometer obtained by the folding operation described above, the folded portion, the inside portion of the cut, or the elongated portion may be bonded or welded to the heat insulator or the substrate. This fixes the shape of the wireless thermometer, and improves the efficiency in assembling the wireless thermometer.

Although the shapes of antennas that are substantially overlapped with each other in plan view are substantially the same in the embodiments described above, the shapes of the antennas may be partially the same. Parts of the antennas may not be overlapped with each other. However, when the shapes of the antennas that are substantially overlapped with each other in plan view are substantially the same, the degrees of coupling with the base-side antenna can be made substantially the same. It is preferable in this case that the distance between the antennas substantially overlapping with each other in plan view be smaller than at least the thickness of the heat insulator.

In the structure formed by bending or folding as described above, the bending or folding is performed with external force. However, when a thermally deformable material is used, the bending or folding can be done with external heat.

The wireless thermometer described in each embodiment may be used, for example, as a deep body thermometer for measuring a deep body temperature. With the configuration described above, the size of the wireless thermometer can be reduced. Therefore, it is possible to accurately measure the deep body temperature without causing any discomfort to the object and without restricting the movement of the object. Moreover, since the measurement can be made even when the portable base unit and the wireless thermometer are more distant from each other than before, the deep body temperature can be easily measured. For example, the wireless thermometer can be effectively used in continuously monitoring the deep body temperature.

1: wireless temperature measuring system
10, 10A, 10B, 10C, 10D, 10E: wireless thermometer
10CF, 10CF', 10DF, 10EF, 10FF, 10GF: base member
111, 112, 113, 114: quartz crystal vibrator
210, 310, 310A, 210B, 220B, 310B, 320B, 210C, 310C, 210D, 310D, 210E, 220E, 310E, 320E, 210F, 220F, 310F, 320F, 210G, 220G, 310G, 320G: antenna
211, 311, 311A, 211B, 221B, 311B, 321B, 211C, 311C, 211D, 311D, 211E, 221E, 311E, 321E, 211F, 221F, 311F, 321F, 211G, 221G, 311G, 321G: winding conductor
212, 222, 312A, 212B, 222B, 312B, 322B, 212C, 312C, 212D, 312D, 212E, 222E, 312E, 322E, 212F, 222F, 312F, 322F, 212G, 222G, 312G, 322G: lead conductor
500, 500B, 501B, 500C, 500D, 501E, 502E: heat insulator
600C, 601C, 601D, 602D, 601E, 602E, 601F, 601G: substrate
661, 661A, 661B: insulating layer
611, 611A, 611B, 611C, 611D, 611E: top heat insulator
612, 612A, 612B, 612C: bottom heat insulator
621D, 621E: main portion
622D, 622E, 623E: elongated portion
702, 701E, 701F, 702F, 701G, 702G: cut
711C: indentation
771C: first end region
772C: second end region
773C: central region
90: portable base terminal
91: control unit
92: transmission signal generating unit
93: transmitting/receiving unit
94: base-side antenna
95: measuring section
951: frequency converting unit
952: temperature detecting unit
953: temperature calculating unit
96: display unit
97: operation unit

The invention claimed is:

1. A wireless thermometer comprising:
a heat insulator having a predetermined thickness, a predetermined thermal resistivity, and a first principal surface and a second principal surface opposite each other;
one or more first temperature detecting means disposed on the first principal surface of the heat insulator;
one or more second temperature detecting means disposed on the second principal surface of the heat insulator;
a first antenna connected to the first temperature detecting means and configured to transmit a first detection signal generated by the first temperature detecting means; and
a second antenna connected to the second temperature detecting means and configured to transmit a second detection signal generated by the second temperature detecting means,
wherein the first antenna and the second antenna are spaced apart by a predetermined distance in a direction parallel to a thickness direction of the heat insulator, and disposed so that antenna forming regions are at least partially overlapped with each other as viewed in the direction parallel to the thickness direction.

2. The wireless thermometer according to claim 1, wherein at least one of a first lead conductor connecting the first temperature detecting means to the first antenna and a second lead conductor connecting the second temperature detecting means to the second antenna has at least one bent portion; and
the bent portion is formed such that the first temperature detecting means and the second temperature detecting means are overlapped with each other by folding, as viewed in a direction orthogonal to a plane of the heat insulator or a substrate on which the first antenna and the second antenna are arranged.

3. The wireless thermometer according to claim 2, wherein at least an overlapping portion of the first lead conductor or the second lead conductor, the overlapping portion being formed by folding, is sandwiched between insulating layers.

4. The wireless thermometer according to claim 2, wherein the overlapping portion formed by folding is in contact with a surface of the substrate opposite to a surface where the first lead conductor or the second lead conductor is formed.

5. The wireless thermometer according to claim 2, wherein the overlapping portion formed by folding is welded or bonded.

6. The wireless thermometer according to claim 2, wherein the substrate is provided with a cut or an indentation at a position of a folded portion of the first lead conductor or the second lead conductor.

7. The wireless thermometer according to claim 2, wherein the folded portion is made of a thermally deformable material.

8. The wireless thermometer according to claim 1, wherein the first antenna and the second antenna are wound on a surface substantially orthogonal to the thickness direction of the heat insulator, and
the first temperature detecting means is disposed on a region surrounded by the first antenna, and the second temperature detecting means is disposed on a region surrounded by the second antenna.

9. The wireless thermometer according to claim 1, wherein the first temperature detecting means and the second temperature detecting means operate in response to respective radio signals input through the first antenna and the second antenna, and generate the first detection signal and the second detection signal, respectively, corresponding to detected temperatures.

10. The wireless thermometer according to claim 1, wherein the first antenna and the second antenna are formed on different substrates.

11. The wireless thermometer according to claim 1, wherein the first antenna and the second antenna are formed on a single substrate.

12. The wireless thermometer according to claim 11, wherein the first antenna and the second antenna are formed on opposite surfaces of the single substrate.

13. The wireless thermometer according to claim 11, wherein the first antenna and the second antenna are formed on one surface of the single substrate.

14. The wireless thermometer according to claim 13, wherein one of the first antenna and the second antenna is disposed to surround another.

15. The wireless thermometer according to claim 1, wherein a shape of a radiating portion of the first antenna is substantially the same as a shape of a radiating portion of the second antenna.

16. The wireless thermometer according to claim 1, wherein the wireless thermometer comprises a plurality of at least one of the first temperature detecting means and the second temperature detecting means, and an antenna is provided for each of the plurality of the at least one of the first temperature detecting means and the second temperature detecting means.

17. The wireless thermometer according to claim 16, wherein the antennas connected to the plurality of the least one of the first temperature detecting means and the second temperature detecting means are arranged close to each other as viewed along the thickness direction of the heat insulator.

18. The wireless thermometer according to claim 1, wherein the first temperature detecting means and the second temperature detecting means are each a resonator having a resonance frequency that varies with temperature.

19. The wireless thermometer according to claim 18, wherein the resonator is a quartz crystal vibrator.

20. The wireless thermometer according to claim 1, wherein the first temperature detecting means and the second temperature detecting means are each an RFID-IC having a temperature sensor.

21. The wireless thermometer according to claim 1, wherein the wireless thermometer is a deep body thermometer including mounting means for mounting on a temperature measured portion of an object, the deep body thermometer being configured to measure a deep body temperature of the object.

22. A wireless thermometer comprising:
a heat insulator having a predetermined thickness, a predetermined thermal resistivity, and a first principal surface and a second principal surface opposite each other;
one or more first temperature detecting means disposed on the first principal surface of the heat insulator;
one or more second temperature detecting means disposed on the second principal surface of the heat insulator;
a first antenna connected to the first temperature detecting means and configured to transmit a first detection signal generated by the first temperature detecting means; and
a second antenna connected to the second temperature detecting means and configured to transmit a second detection signal generated by the second temperature detecting means,
wherein the first antenna and the second antenna are arranged close to each other in substantially the same plane parallel to the first principal surface and the second principal surface.

23. The wireless thermometer according to claim 22, wherein the first antenna and the second antenna are wound on a surface substantially orthogonal to the thickness direction of the heat insulator.

24. The wireless thermometer according to claim 22, wherein at least one of a first lead conductor connecting the first temperature detecting means to the first antenna and a second lead conductor connecting the second temperature detecting means to the second antenna has at least one bent portion; and
the bent portion is formed such that the first temperature detecting means and the second temperature detecting means are overlapped with each other by folding, as viewed in a direction orthogonal to a plane of the heat insulator or a substrate on which the first antenna and the second antenna are arranged.

* * * * *